United States Patent [19]

Miyaza

[11] Patent Number: 5,424,853
[45] Date of Patent: Jun. 13, 1995

[54] IMAGE PROCESSING APPARATUS
[75] Inventor: Masao Miyaza, Osaka, Japan
[73] Assignee: Sharp Kabushiki Kaisha, Osaka, Japan
[21] Appl. No.: 228,400
[22] Filed: Apr. 15, 1994
[30] Foreign Application Priority Data Apr. 19, 1993 [JP] Japan .................. 5-091567
May 25, 1993 [JP] Japan .................. 5-122780

[51] Int. Cl.6 ............................................. H04N 1/393
[52] U.S. Cl. ..................... 358/451; 358/453
[58] Field of Search .............. 358/451, 453; 382/47; 355/55, 243

[56] References Cited

U.S. PATENT DOCUMENTS

| 4,417,805 | 11/1983 | Kishi ..................... 358/451 |
| 4,837,635 | 6/1989 | Santos ................... 358/451 |
| 4,851,883 | 7/1989 | Ito ........................ 355/243 |
| 4,899,227 | 2/1990 | Yamada ................. 358/451 |
| 5,053,885 | 10/1991 | Telle ..................... 358/451 |

FOREIGN PATENT DOCUMENTS 2-92068 3/1990 Japan .
2-295272 12/1990 Japan .

Primary Examiner—Scott A. Rogers

[57] ABSTRACT

An image processing apparatus obtains an exact distance of a marking portion shown on a document image based upon a magnification (reduction) shown on a document image such as a map etc. following the sequence of processes as mentioned below. First, a reduction value and a marking portion are recognized from an image data of a document image, and the marking portion is combined with the image data. Next, a dimension of the marking portion is obtained, and the exact distance of the marking portion is calculated based upon the obtained dimension and the reduction value. Then, after the distance value has been combined with the image data, the image data is outputted (copied). By adopting the processes, for example, in the case where an exact distance of a predetermined interval on the map is expected to be obtained, the desired distance value is shown in an outputted image only by preliminarily describing a marking on a specified interval in the document image. This makes it possible to improve added value of the apparatus when the image processing apparatus is applied to a digital copying machine and the like.

7 Claims, 17 Drawing Sheets

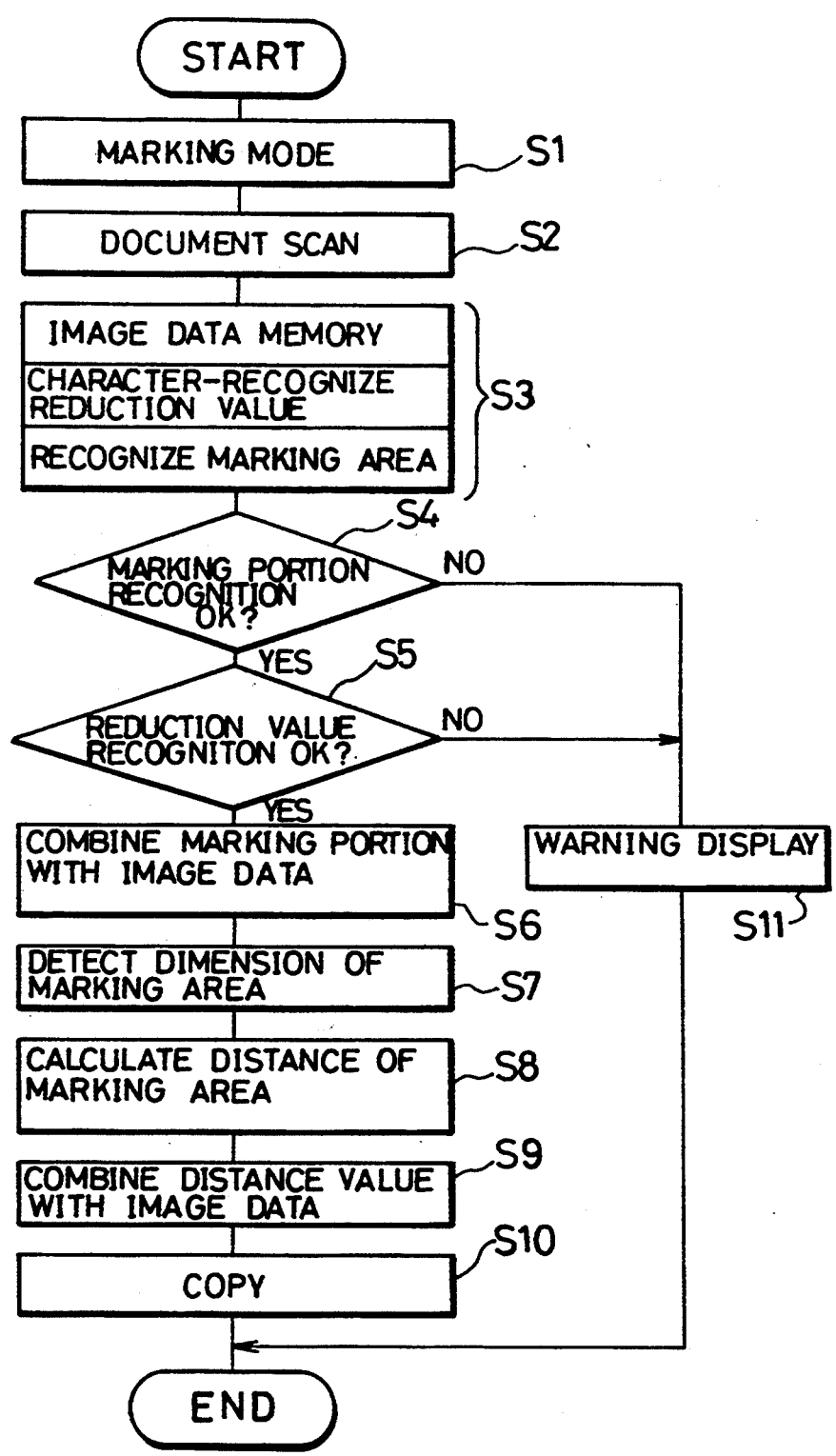

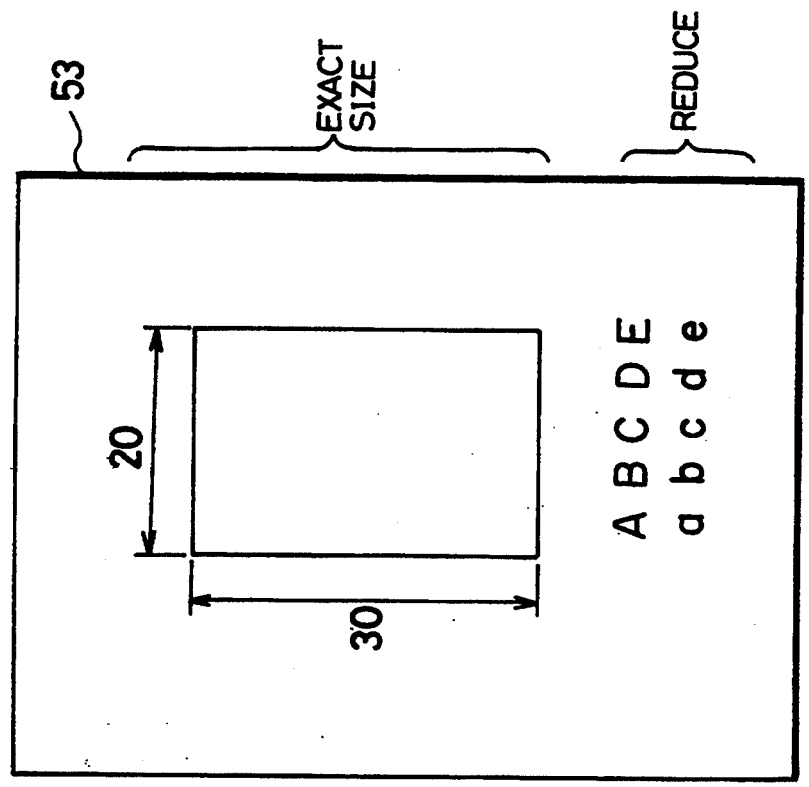
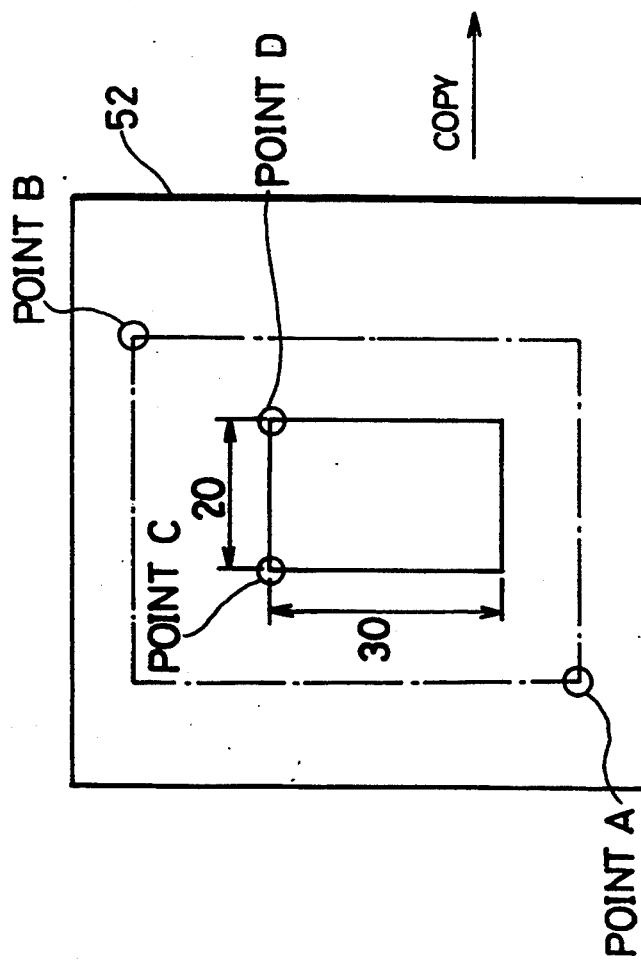

IMAGE PROCESSING APPARATUS

FIELD OF THE INVENTION

The present invention relates to image processing apparatuses, such as copying machines, facsimiles, scanner printers, for supplying a predetermined process to image data of an original document, which have been read by input means.

BACKGROUND OF THE INVENTION

Recently, an image processing apparatus, for example, a copying machine which is capable of enlarging and reducing has been spread through the world. Such a copying machine, which can easily provide copying images of a desired magnification for document images, is in common use for copying maps, design drawings of machines and buildings and the like.

Further, as to such kind of a copying machine, a digital copying machine is also in common use. The digital copying machine reads scanned document images by using an image pickup element such as a CCD (Charge Coupled Device) sensor, etc. and stores the image data in an image memory. The digital copying machine then enlarges or reduces the image data, and outputs the image data. Since such a machine temporarily stores image data of a document in the image memory, it is easy to enlarge or reduce the image data.

In the processes of enlargement and reduction, longitudinal and lateral magnifications may be set differently. Further, a copying magnification is suitably set by an operator (manual magnification setting), or automatically set according to a size of a copy sheet (automatic magnification setting).

However, with respect to processes of enlargement and reduction, since a conventional digital copying machine is capable of only enlarging or reducing a whole image, the function is low in spite of the advantage of an easy process for image data, thereby causing low added value.

Therefore, an image processing apparatus such as the above-mentioned copying machine is hoped to be developed so as to have a function which can solve following problems and so as to rise added value of the apparatus.

For example, although design drawings of machines and buildings are made in an exact dimension or an accurate magnification, when they are copied by a copying machine, the copy image is very difficult to determine whether a dimension of the copy image is same as the exact dimension, enlarged, or reduced. Furthermore, after enlarging and reducing are repeated, the magnifications of the drawing becomes difficult to be discriminated. As a result it is hard to grasp the exact dimension.

In addition, since blank portions were also enlarged or reduced, when a drawing is returned to its exact dimension, there cause problems that the image is too large or too small for a specified size of sheets. More specifically, it is very troublesome to return a drawing to its original aspect ratio after the lengthwise and breadthwise magnifications of the drawing have been set separately so as to be copied. Further, during a copying operation, a distortion of a copy image may occur, due to lifting or twisting of a document, so that the copy image inclines.

Incidentally, when you want to know the distance of a specified section of a road shown in a map, you have took measure the distance on the map by using a ruler, and multiply the measured value by a reduction value of the map. However, such a way requires a lot of troublesome work such as measuring a length and multiplying the measured length by a reduction value of the map. In addition, since the length is measured on the map, the accurate distance cannot be obtained. When an exact dimension and a scale of a reduction value are not shown in a map, it is almost impossible to know a dimension and a distance.

In not only a copying machine but also a facsimile and an image processing apparatus having a scanner, it is occasionally difficult to process read image data because of inaccuracy of a dimension and a distance, an error in the magnification of a lengthwise magnification to a breadthwise magnification, distortion of a copy image, etc.

SUMMARY OF THE INVENTION

It is an object of the present invention to provide an image processing apparatus which is capable of easily compensating for an enlargement or a reduction magnifications, finding a distance on a map, and compensating for a distortion of an image.

In order to accomplish the above object, a first image processing apparatus of the present invention includes:

image input means for reading a document image;

magnification recognition means for recognizing a magnification of the document image to an actual image, which is shown on the document image, from image data of the document image read by said image input means;

mark recognition means for recognizing interval marks shown in the document image from the image data of the document image;

dimension calculating means for calculating a dimension of intervals which have been specified by the interval marks;

conversion means for converting a dimension of the interval to a length with a magnification of 1 based upon the magnification of the document; and combining means for combining the image data with data of the conversion value obtained by said conversion means.

With the arrangement, a magnification is recognized by the magnification recognition means from image data of a document image, and a interval mark is recognized by the mark recognition means. Then, a dimension of an interval specified by the interval marks is calculated by the dimension calculating means, and the calculated dimension is converted by the conversion means. For example, in the case where the magnification is 1/1500, if the dimension of the interval is 200 mm, an exact distance of the interval in the case of the magnification of 1 becomes 300 m.

Data of conversion values which have been converted as mentioned above are combined with the image data by the combining means. Therefore, data of the exact distances are added to the combined image data.

When an arbitrary interval on the document image is marked, the marked portion undergoes the above-mentioned processes, and the actual distance of the marked portion is added to the document image. Moreover, the exact distance of the marked portion can be easily found by visualizing and outputting the combined data. Therefore, when an exact distance of an arbitrary interval on a map, etc., is desired to be found, the troublesome works such as taking a measure by using a ruler and multiplying the measured value by a reduction value are not required.

A second image processing apparatus of the present invention includes:

image input means for reading a document image;

area specifying means for specifying an arbitrary area in the document image read by said image input means;

interval specifying means for specifying arbitrary intervals in the document image;

dimension calculating means for calculating a dimension of the intervals;

dimension input means for inputting a prescribed dimension of the intervals;

ratio calculating means for calculating a ratio of the interval dimension to the prescribed dimension;

first magnification setting means for setting a reciprocal of the ratio as a first magnification of the specified area which has been specified by said area specifying means;

first conversion means for converting a size of a first image within the specified area in accordance with the first magnification;

second magnification setting means for setting a second magnification of an unspecified area so that a second image in the unspecified area does not exceed a predetermined size of sheets, the unspecified area being other than the specified area on a sheet of a predetermined size which is provided for the first image whose size has been converted by said first conversion means;

second conversion means for converting the size of the second image in accordance with the second magnification; and combining means for combining image data of both the images whose sizes have been converted by said first and said second conversion means.

With the arrangement, an arbitrary area on a document image is specified by the area specifying means, and an arbitrary interval is specified by the interval specifying means. Then, a dimension of the interval is calculated by the dimension calculating means. Meanwhile, when a prescribed dimension of the interval is inputted by the dimension input means, the ratio of the interval dimension to the prescribed dimension is calculated by the ratio calculating means.

Next, when the first magnification of the specified area is set by the first magnification setting means based on the calculated ratio, a size of the first image within the specified area is converted by the first conversion means in accordance with the first magnification. Then, the second magnification in an unspecified area which is other than the specified area is set by the second magnification setting means based on the first image whose size has been converted and a predetermined size of sheets. More specifically, the second magnification is set so that the second image in the unspecified area is within the space which is left by deducting the specified area from the whole space of the sheet. Then, the size of the second image is converted by the second conversion means in accordance with the second magnification.

Therefore, only the first image in the specified area is converted at an arbitrary magnification, and the second image in the unspecified area is converted to a magnification according to a predetermined size. The image data of both the converted images are combined by the combining means so as to be combined image data which are within the predetermined size of sheets.

Moreover, an image, which has been converted to an arbitrary size, can be obtained by visualizing and outputting the combined data.

In the above-mentioned arrangement, in the case where an image, which has been obtained by reducing or enlarging an original image, is used as a document image, the document image can be converted to a size of the original image even if a reduction or an enlargement magnification is unclear. More specifically, when a prescribed dimension of the specified interval on the document image is changed to a dimension of an interval on the original image, that is, an exact dimension, the interval on the document image is converted to the exact dimension.

The above-mentioned processes make it possible to convert the specified first image to an arbitrary size even if it is unclear whether the document image has an exact dimension, is enlarged or reduced. Similarly, even if the magnification of the document image to the original image is unclear due to repetitions of enlarging and reducing, the specified first image can be converted to an arbitrary size. Further, when a size of the second image, which is not necessary to be converted at the first magnification, is converted at the second magnification, the first and the second images whose sizes have been converted are within a sheet of a predetermined size. Therefore, when a variable magnification copying of a drawing is carried out, an image of a suitable size according to a predetermined size of a sheet can be obtained.

A third image processing apparatus of the present invention includes:

image input means for reading a document image;

interval specifying means for specifying an arbitrary interval in a document image read by said image input means;

dimension calculating means for calculating a dimension of the interval;

dimension input means for inputting a prescribed dimension of the interval;

ratio calculating means for calculating a ratio of the dimension of the interval to the prescribed dimension;

magnification input means for inputting an arbitrary magnification to an exact dimension which is equivalent to the prescribed dimension;

conversion magnification calculating means for calculating a conversion magnification, which is used in the case where a size of the document image is converted, in accordance with the ratio and the magnification so that the document image has the same dimension as an image which has been obtained by converting a size of the image having an exact dimension of the document image at a magnification inputted by said magnification input means; and conversion means for converting a size of the document image in accordance with the conversion magnification.

With the arrangement, when an arbitrary interval on a document image is specified by the interval specifying means, a dimension of the interval is calculated by the dimension calculating means. Meanwhile, when a prescribed dimension of the interval is inputted by the dimension input means, a ratio of the interval dimension to the prescribed dimension is calculated by the ratio calculating means.

When an arbitrary magnification to the prescribed dimension (exact dimension) is inputted by the magnification input means, a conversion magnification is calculated by the conversion magnification calculating means, and the size of the document image is converted by the conversion means based on the conversion magnification. Therefore, the converted image has the same size as the image obtained by converting the image of the document image having the exact dimension at the above-mentioned magnification. In addition, an image which has been converted to an arbitrary dimension to the exact dimension can be obtained by visualizing and outputting the combined data.

In the above-mentioned arrangement, when an image obtained by reducing or enlarging an original image having an exact dimension is used as a document image, a dimension of the document image can be converted at an arbitrary magnification to the image having the exact dimension even if the reduction or the enlargement magnification is unclear. More specifically, the prescribed dimension of the interval on the document image is changed to the exact dimension, the interval is converted on the basis of the exact dimension.

The above-mentioned processes make it possible to convert the dimension of the document image even if it is unclear whether the document image has the same dimension as the image having the exact dimension, enlarged or reduced. In addition, when the magnification of the document image to the image having the exact dimension is unclear due to repetitions of enlarging and reducing, the size of the document image can be converted on the basis of the image having the exact dimension.

A fourth image processing apparatus of the present invention includes:

image input means for reading a document image;

interval specifying means for specifying an arbitrary interval in the document image read by said image input means;

dimension calculating means for calculating a dimension of the interval;

dimension input means for inputting a prescribed dimension of the intervals specified by said interval specifying means;

first ratio calculating means for calculating a first ratio of the dimension of the intervals to the prescribed dimension;

magnification input means for inputting an arbitrary magnification to the document image;

conversion means for converting a size of the document image in accordance with the magnification;

second ratio calculating means for calculating a second ratio of the dimension of the intervals in the document image, whose size has been converted by said conversion means, to the prescribed dimension in accordance with the first ratio and the magnification; and combining means for combining the data of the second ratio with the image data of the document image.

With the arrangement, when an arbitrary interval on a document image is specified by the interval specifying means, a dimension of the interval is calculated by the dimension calculating means. Meanwhile, when a prescribed dimension of the interval is inputted by the dimension input means, the first ratio of the interval dimension to the prescribed dimension is calculated by the first ratio calculating means.

When an arbitrary magnification to the document image is inputted by the magnification input means, the size of the document image is converted by the conversion means at the inputted magnification. Meanwhile, the second ratio is calculated by the second ratio calculating means based on the first ratio and the magnification. Then, the data of the second ratio is combined with the image data of the document image by the combining means. In addition, an image converted to an arbitrary size to the exact dimension can be obtained by visualizing and outputting the combined data.

In the above-mentioned arrangement, in the case where an image which has been obtained by reducing or enlarging an original image is used as a document image, when the document image is enlarged or reduced at an arbitrary magnification (a first magnification), a magnification to the original image (a second magnification) is added to the obtained image. More specifically, when a prescribed dimension of an interval on the document image is changed to the exact dimension, the interval is converted on the basis of the exact dimension.

The above processes make it possible to find what magnification to a prescribed dimension (a dimension of an original image) is used for obtaining an image which have been enlarged or reduced even if it is unclear whether an document image has an exact dimension, enlarged or reduced.

A fifth image processing apparatus of the present invention includes:

image input means for reading a document image;

segment recognition means for recognizing two segments which cross each other in the document image read by said image input means;

rectangular cross discrimination means for discriminating whether or not the two segments cross at a right angle to each other; and rectangular cross compensation means for compensating for the image data of the document image so that the two segments cross at the right angle to each other when a discrimination is made by said rectangular cross discrimination means that the two segments do not cross at the right angle to each other.

With the arrangement, when two segments which cross each other in a document image are recognized by the segment recognition means, a discrimination is made as to whether or not the two segments are at right angles to each other by the rectangular cross discrimination means. This discrimination is made, for example, by checking whether or not a triangle, which is formed by the intersection of the segments and respective end points of the segments, is a right triangle. When the discrimination is made that the segments are not at right angles to each other, the image data is compensated by the rectangular cross compensation means. This compensation is made, for example, by transferring either of the segments. In addition, an image which has been compensated for a distortion can be obtained by visualizing and outputting the compensated data.

In the above-mentioned arrangement, when a document image is obtained by copying an original image and a distortion is caused then, the distortion can be compensated.

A sixth image processing apparatus of the present invention includes:

image input means for reading a document image of a map;

reduction ratio input means for inputting a reduction ratio of the map;

reference point input means for inputting a reference point on a road shown in the map;

interval input means for inputting predetermined intervals on the road by an exact distance;

unit length calculating means for calculating a unit length which is equal to a length of a unit distance on the map in accordance with the reduction ratio;

conversion means for converting the intervals to the length on the map by the unit length;

road recognition means for recognizing the road from the image data starting at a reference point by superimposing the reference point on the image data of the document image read by said image input means; and combining means for combining marking data with the image data of the road, which have been recognized by said road recognition means, for each converted interval which has been converted by said conversion means.

With the arrangement, prior to a marking process, all sorts of information related to the map is inputted. More specifically, a reduction ratio is inputted by the reduction ratio input means, a reference point on a road of a map is inputted by the reference point input means, and a predetermined interval on the road is inputted by the interval input means at the exact distance. Then, a unit length on the map is calculated by the unit length calculating means at the reduction ratio. Meanwhile, the interval is converted to the length on the map by the conversion means based upon the unit length.

Moreover, in the road recognition means, the reference point is superimposed on the image data, and the road of the image data is recognized starting at the reference point. Then, data of the markings are combined with the image data of the road by the combining means for each conversion interval. Further, an image which has been marked can be obtained by visualizing and outputting the combined data.

In the above-mentioned arrangement, since marks are added to the road of the map per inputted intervals, the distance of the road can be found easily.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a flow chart which shows an operation of a marking mode in the digital copying machine according to the first embodiment of the present invention.

FIG. 7(a) is a schematic drawing which shows points to be pressed down at the time of inputting coordinates of an area and a distance on the document in the compensation mode.

FIG. 7(b) is a schematic drawing which shows a state of an image copied in the compensation mode.

DESCRIPTION OF THE EMBODIMENTS

EMBODIMENT 1

Referring to FIGS. 1 through 7, the following description will discuss the first embodiment of the present invention.

Figure 1:
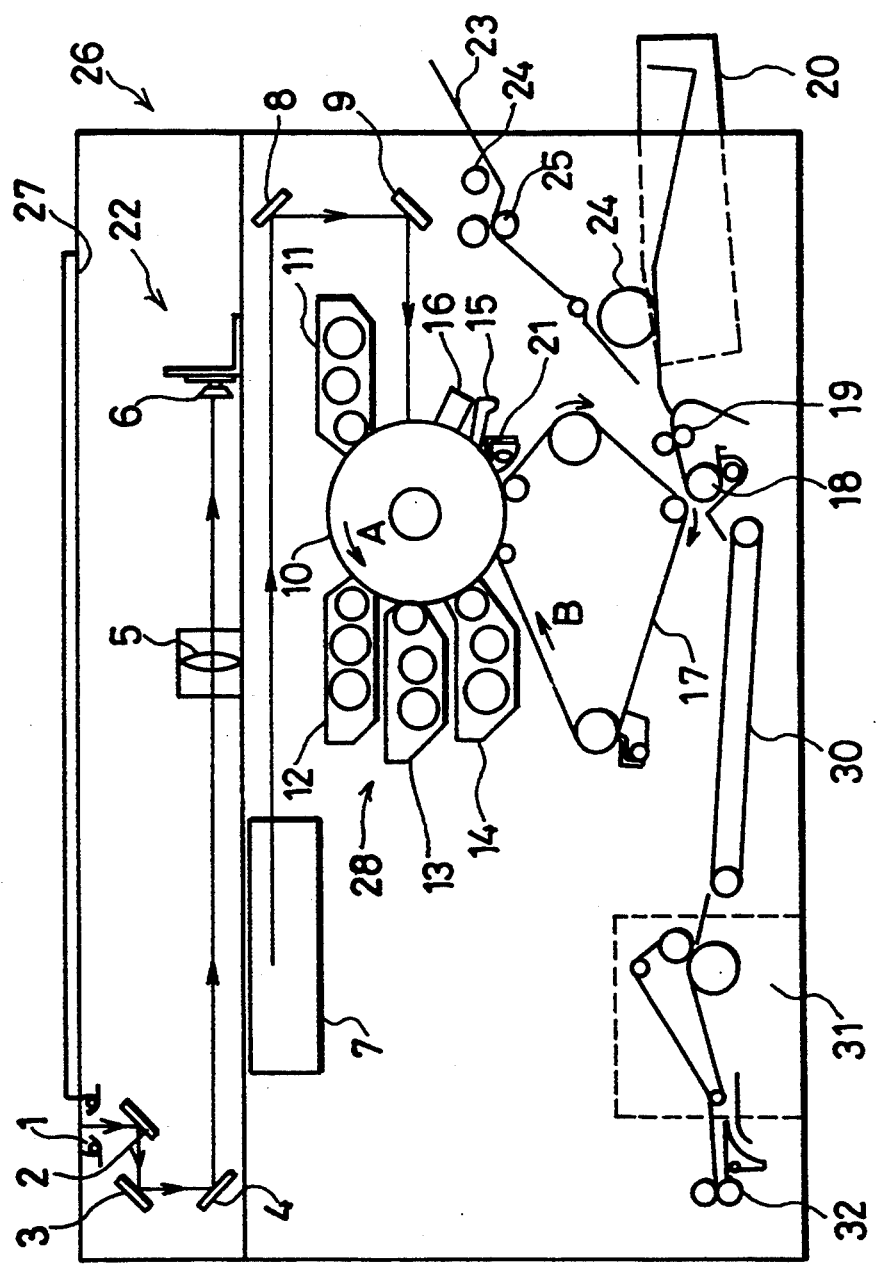
FIG. 1 is a drawing which schematically shows a construction of the digital copying machine according to the first and the second embodiments of the present invention.
Figure 2:
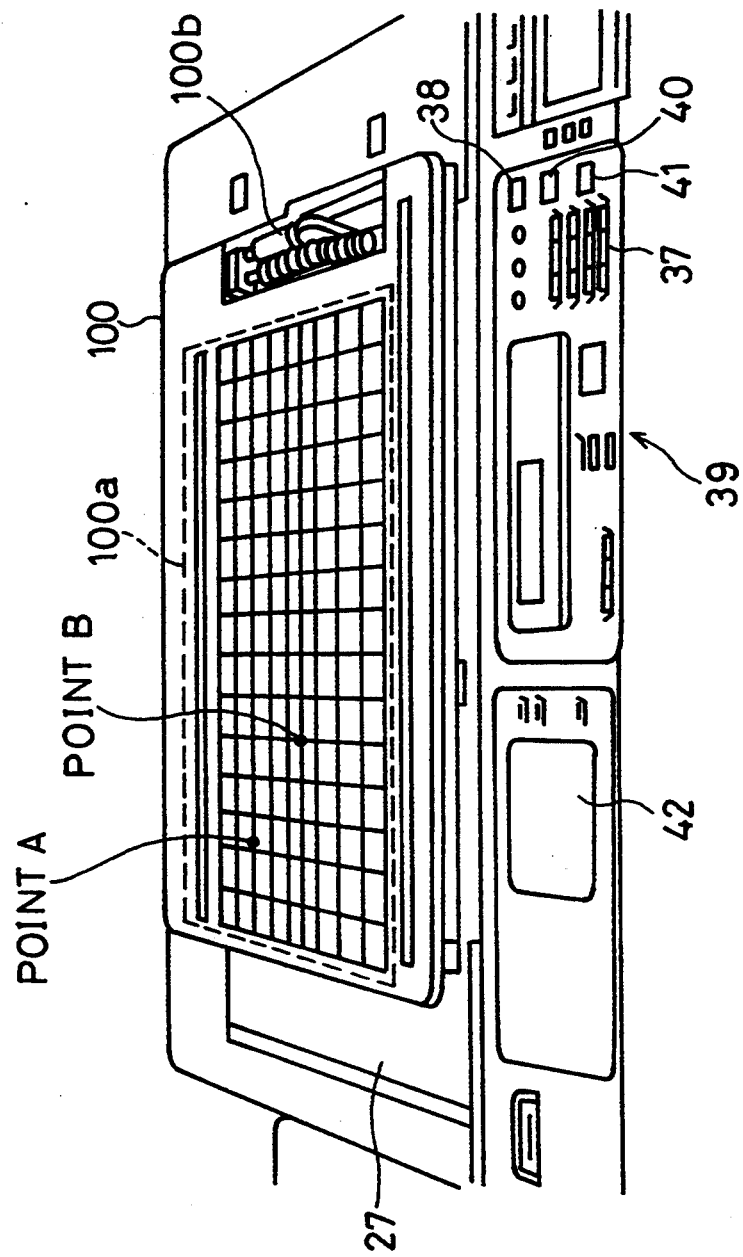
FIG. 2 is a perspective view of an operation panel and a coordinate input sections provided in the above-mentioned digital copying machine.

As illustrated in FIG. 1, a digital copying machine, which is an image processing apparatus of the present embodiment, is provided with a document platen 27 made of a hard transparent glass plate, etc. that is installed on the upper end of a copying machine main body 26. As illustrated in FIG. 2, an operation panel section 39 adjoining the document platen 27 is installed on the upper surface of the copying machine main body 26.

The operation panel section 39 includes a ten-key (dimension input means) 37, a compensation mode setting key 38, a marking mode setting key 40, a magnification display mode setting key 41 and a liquid crystal display panel 42. The liquid crystal display panel 42 is constituted of a touch panel which is provided with a touch sensor. The liquid crystal display panel 42 is capable of displaying all kinds of information from the main body apparatus, and transmitting designations of mode settings, etc. by using the touch panel to an image processing CPU 74 which is provided in an image processing section, mentioned later. The ten keys 37 are used for inputting an exact dimension of a specified interval when a marking mode, mentioned later, is specified.

Furthermore, a tablet-type coordinate input section (area specifying means and interval specifying means) 100, which is also used as a document platen cover, is installed on the upper surface of the document platen 27. The coordinate input section 100 includes a tablet board 100a and a point pen 100b. A point on the tablet board 100a is pressed by the point pen 100b, thereby outputting the coordinate of the pressed point to the image processing CPU 74, mentioned later. The coordinate input section 100 is used for inputting a specified area and a specifying interval when a compensation mode is specified.

Meanwhile, as shown in FIG. 1, a scanner unit (image input means) 22 having a lamp unit 1, mirrors 2, 3 and 4, a lens unit 5, a CCD (Charge Coupled Device) sensor 6, etc. is installed below the document platen 27. A reflected light beam, which is obtained by irradiating a document (not shown) placed on the document platen 27 by using the lamp unit 1, is sent to the light-receiving face of the CCD sensor 6 through the mirrors 2, 3 and 4 and the lens unit 5, and detected therein as electric signals.

A laser driver unit 7 is installed below the scanner unit 22. Image data of the document, which are detected as the electric signals by the CCD sensor 6, are temporarily stored in a main memory 73, mentioned later, installed in the image processing section. After undergoing a predetermined process in the image processing section, the image data are sent to the laser driver unit 7. The laser driver unit 7 includes a semiconductor laser, a polygon mirror, an f-$\theta$ lens, etc. which are not shown. The semiconductor laser projects a laser beam in response to image data inputted to the laser driver unit 7. The polygon mirror deflects the laser beam in a constant angular velocity. The f-$\theta$ lens compensates for the laser beam which have been deflected in a constant angular velocity so that the laser beam is further deflected in a constant velocity on a photoreceptor drum 10.

A laser beam released from the laser driver unit 7 is reflected by the mirrors 8 and 9 provided on the light path, and projected onto the photoreceptor drum 10 which is capable of rotating in the direction of arrow A as shown in FIG. 1, thereby forming an electrostatic latent image on the photoreceptor 10. A charger 16, a developing device 28, a transferring belt 17, a cleaning unit 21, a charge eliminating lamp 15, etc. are installed in this order on the periphery of the photoreceptor drum 10.

The charger 16 charges the surface of the photoreceptor drum 10 so as to impart a predetermined potential prior to an exposure executed by the laser driver unit 7. The developing device 28 supplies toner onto the electrostatic latent image so that a toner image is formed on the photoreceptor drum 10. The toner image on the photoreceptor drum 10 is intermediately transferred onto the transferring belt 17. The cleaning unit 21 scrapes the residual toner off from the photoreceptor drum 10. The charge eliminating lamp 15 eliminates the residual electric potential from the photoreceptor drum 10 prior to next charging.

The developing unit 28 includes a black developer vessel 11, a yellow developer vessel 12, a magenta developer vessel 13 and a cyan developer vessel 14, and those developer vessels 11 through 14 respectively house toner having corresponding colors. The transferring belt 17, which is provided in the form of an endless belt, is installed so as to move in the direction of arrow B of FIG. 1, and one portion of the transferring belt 17 is pressed against the photoreceptor drum 10 such that the toner image on the photoreceptor drum 10 is transferred thereonto.

A register roller 19 for feeding copy sheets onto the transferring belt 17 at predetermined intervals, a feeding cassette 20 for storing copy sheets and a feeding tray 23 whereon copy sheets are placed are installed on the paper-feeding side of the transferring belt 17. A feeding roller 24, a transporting roller 25, etc. for transporting copy sheets are installed in the proximity of the feeding cassette 20 and the feeding tray 23.

A transferring roller 18 is installed below the transferring belt 17. The transferring roller 18 presses a copy sheet sent from the register roller 19 against the transferring belt 17 so as to transfer the toner image on the transferring belt 17 onto the copy sheet.

A transporting belt 30 for transporting copy sheets whereon the toner image has been transferred, a fixing device 31 for fusing the toner image onto a copy sheet by using heat and a discharging roller 32 for discharging the copy sheet whereon the toner image has been fused by heat outside the apparatus are installed on the paper-discharging side of the transferring belt 17. The image output means is constituted of the laser driver unit 7, the photoreceptor drum 10, the charger 16, the transferring belt 17, the cleaning device 21, the charge eliminating lamp 15, the black developer vessel 11, the yellow developer vessel 12, the magenta developer vessel 13, the cyan developer vessel 14, the feeding cassette 20, etc.

In the above arrangement, a color-copy (3 color copy) operation is carried out in the following sequence. First, the charger 16 uniformly charges the surface of the photoreceptor drum 10, and the scanner unit 22 executes the first scanning. Image data detected by the CCD sensor 6 are processed in the image processing section, and are outputted from the laser driver unit 7 as a laser beam of yellow data. The surface of the photoreceptor drum 10 is exposed by the laser beam, and an electrostatic latent image for yellow-use is formed on the exposed portion of the photoreceptor drum 10. Then, the electrostatic latent image within the image region is changed to a yellow toner image by yellow toner supplied from the yellow developer vessel 12.

Next, the yellow toner image is transferred onto the transferring belt 17 which is pressed against the photoreceptor drum 10. At this time, although some toner that has not been consumed in the transferring process remains on the surface of the photoreceptor drum 10, the residual toner is scraped off by the cleaning unit 21. Moreover, the residual charge on the surface of the photoreceptor drum 10 is eliminated by the charge eliminating lamp 15.

After completion of the above process, the charger 16 uniformly charges again the surface of the photoreceptor drum 10, and the scanner unit 22 executes the second scanning. The image data obtained by the above process, are processed in the image processing section, and are converted to a laser beam as magenta data. The photoreceptor drum 10 is exposed by the converted laser beam such that an electrostatic latent image for magenta-use is formed. Then, the electrostatic latent image is changed to the same magenta toner image by the magenta toner supplied from the magenta developer vessel 13. The magenta toner image is transferred onto the transferring belt 17 so as to be superimposed on the former yellow toner image.

Then, when the cleaning unit 21 and the charge eliminating lamp 15 execute the same processes as before, the charger 16 uniformly charges the photoreceptor drum 10, and the scanner unit 22 executes the third scanning.

The photoreceptor drum 10 is exposed by the laser beam which has been obtained by converting the cyan data, and an electrostatic latent image for cyan-use is formed on the exposed portion of the photoreceptor drum 10. The electrostatic latent image is changed to a cyan toner image by the cyan toner supplied from the cyan developer vessel 14, and the cyan toner image is transferred to the transferring belt 17. As a result, the cyan toner image is superimposed on the yellow and magenta images on the transferring belt 17.

The superimposed toner images on the transferring belt 17 are transferred onto a copy sheet, and fused onto the copy sheet by heat in the fixing device 31, and the copy sheet is discharged out of the apparatus by the discharge roller 32.

The sequence of the processes described above is a sequence for carrying out a three-color copying operation. In the case of a four-color copying operation, a process using black toner in the black developer vessel 11 is added to the above-mentioned sequence. In the case of a black-and-white copying operation, black toner is supplied to the electrostatic latent image on the photoreceptor drum 10 from the black developer vessel 11, and the black toner image thus formed is transferred onto a copy sheet through the transferring belt 17.

The following description will discuss the construction, functions, etc. of the image processing section.

Figure 3:
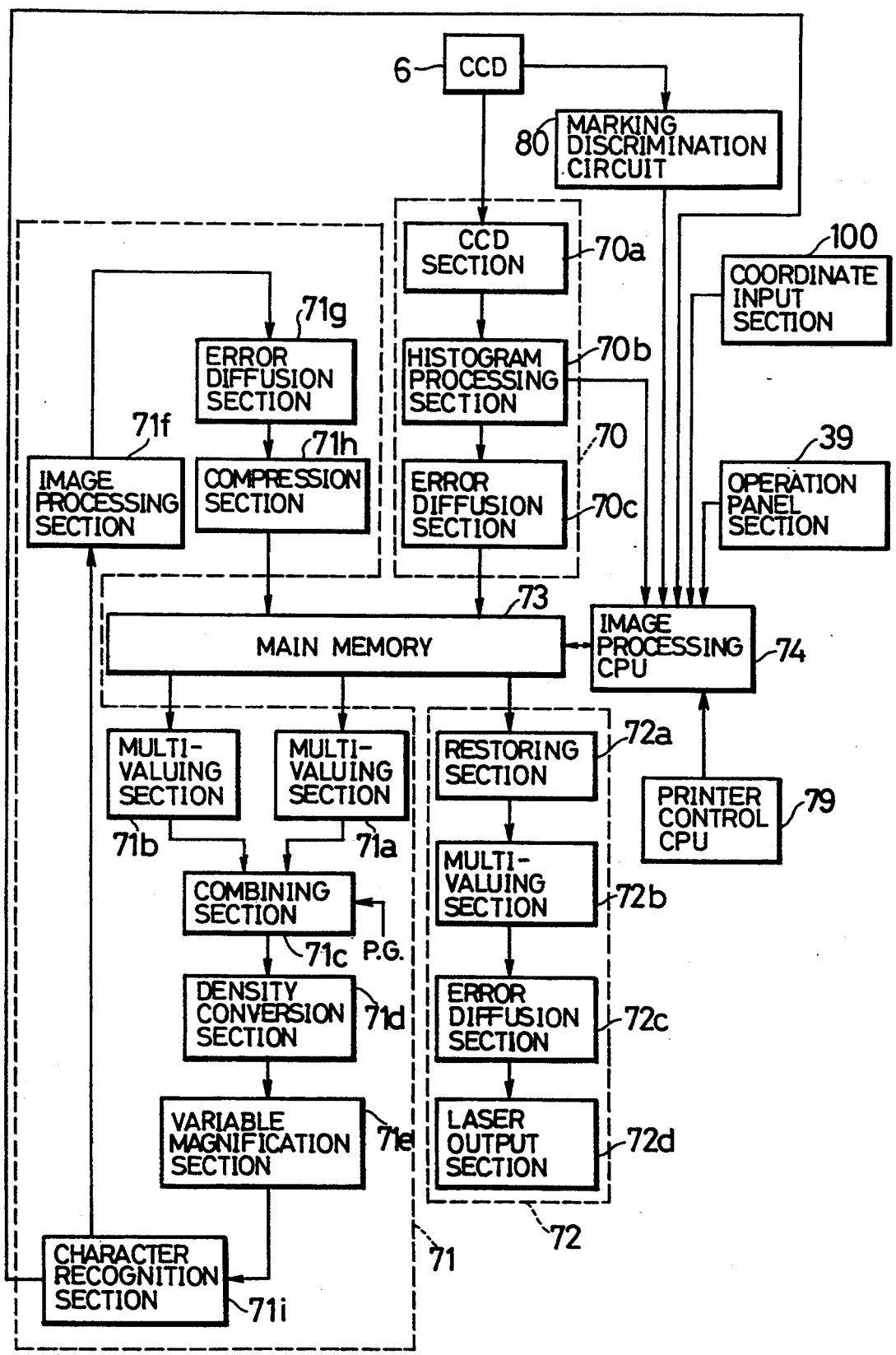
FIG. 3 is a block diagram which shows a construction of a control system provided in the above-mentioned digital copying machine.

The image processing section processes image data read by the CCD sensor 6, and outputs the processed image data to the laser driver unit 7. The image processing section concretely executes color reproduction according to a document, and combining of images at the time when each processing mode, mentioned later, is specified. As shown in FIG. 3, the image processing section includes an image data input section 70, an image processing section 71, an image data output section 72, a main memory 73, an image processing CPU (Central Processing Unit) 74 and a marking discrimination circuit 80.

The image data input section 70 includes a CCD section 70a, a histogram processing section 70b and an error diffusion section 70c. The image data input section 70 applies a binarizing conversion to the image data of the document read by the CCD sensor 6, and processes the image data in accordance with an error diffusion method while taking a histogram as an amount of binary digital. The image data outputted from the image data input section 70 are temporarily stored in the main memory 73 including an RAM (Random Access Memory), etc.

As to the process of the image data in the image data input section 70, its further explanation will be given in detail. First, in the CCD section 70a, after undergoing an A/D conversion, analog electric signals according to each picture element density of the image data is subject to an MTF (Modulation Transfer Function) compensation, a black-and-white compensation or a gamma compensation so as to be outputted to the histogram processing section 70b as digital signals having a tone of 256 (8 bits).

Next, in the histogram processing section 70b, additions are done on the digital signals outputted from the CCD section 70a according to the picture element density in a tone of 256, and the added values are obtained as density information (histogram data). In the histogram processing section 70b, the density information obtained as the occasion demands is sent to the image processing CPU 74, and sent to the error diffusion section 70c as picture element data.

Moreover, the error diffusion section 70c converts the digital signal having 8 bits/picture element, which has been outputted from the CCD section 70a, to one bit (binary) in accordance with the error diffusion method which is a kind of a pseudo half-tone process, and executes a recollocation operation for accurately reproducing a local area density on a document. The error diffusion method allows an error occurred at the time of binarizing conversion to reflect the binary discrimination of adjoining picture elements.

The image processing section 71 includes multi-valuing sections 71a and 71b, a combining section 71c, a density conversion section 71d, a variable magnification section 71e, an image processing section 71f, an error diffusion section 71g, a compression section 71h and a character recognition section 71i.

The image processing section 71 converts inputted image data to image data that an operator desires. The output image data which have been finally converted are stored in the main memory 73. However, respective processing sections in the image processing section 71 function as the occasion demands, so they may not function in some cases.

The following description will discuss the functions of respective processing sections in the image processing section 71. First, in the multi-valuing sections 71a and 71b, the data that was binarized in the error diffusion section 70c are again converted to a tone of 256. In the combining section 71c, logical operations for each picture element, that is, OR, AND or exclusive-OR is selectively executed. The data subject to these operations become picture element data stored in the main memory 73, and bit data from a pattern generator (P.G.) where preset words, phrases and symbols are stored.

Next, in the density conversion section 71d, with respect to the digital signal having a tone of 256, the relation between the input density and output density is arbitrarily set according to a prescribed tone conversion table. Further, in the variable magnification section 71e, interpolation is executed by using known data, which has been inputted in the variable magnification section 71e, according to an indicated variable magnification, thereby obtaining picture element data (density values) corresponding to a magnified picture element. The vertical scanning is magnified, then the horizontal scanning is magnified.

In the character recognition section 71i, the inputted image data are taken in a memory, not shown, installed in the character recognition section 71i. Here, a character string is extracted from the character image in the memory, and characters are cut out one by one. Then, the feature of the cut-out character is extracted, and referring to a sorting dictionary, a character that is most similar to the cut-out character is selected so as to be sent to the image processing section 71f and the image processing CPU 74. Namely, in the character recognition section 71i, when the marking mode is specified, a reduction magnification of a circled portion (see FIG. 5(a)) undergoes a character recognition by using the image data detected in the scanner unit 22.

In the image processing section 71f, the inputted picture element data undergo various image processes, and information collection such as a feature extracting is performed for string data. The error diffusion section 71g executes the processes in like manner of the error diffusion section 70c in the image data input section 70.

The compression section 71h compresses binary data in accordance with a run-length coding. With respect to the compression of the image data, at the time of obtaining the final output image data, the compression is executed in the final process loop.

The image data output section 72 includes a restoring section 72a, a multi-valuing section 72b, an error diffusion section 72c and a laser output section 72d. The image data output section 72 restores the image data which have been stored in a compressed state into the memory 73, and again converts them so as to have a tone of 256. In addition, the image data output section 72 diffuses errors of four-valued data which have a smoother half-tone expression than binary data, and sends the data to the laser output section 72d.

Namely, the restoring section 72a restores the image data which have been compressed by the compressing section 71h. The multi-valuing section 72b executes the processes which are same as those in the multi-valuing sections 71a and 71b of the image processing section 71. The error diffusion section 72c executes the processes which is same as those in the error diffusion section 70c of the image data input section 70.

The laser output section 72d converts digital picture element data to an ON-OFF signal of a laser according to a control signal from a printer control CPU 79, and the laser enters an ON-OFF state. Although the data, which are processed in the image data input section 70 and the image data output section 72, are basically stored in the main memory 73 as binary data so that the capacity of the main memory 73 is reduced, it may be possible to process the data as four-valued data making allowance for deterioration of the image data.

The marking discrimination circuit 80 detects the marking portion in the image by using the image data that have been read from the CCD sensor 6, and outputs the signal to the image processing CPU 74.

The signals are inputted to the image processing CPU 74 from the marking discrimination circuit 80, as well as the operation panel section 39, the character recognition section 71i and the coordinate input section 100. According to these signals, a conversion value calculating and combining process and a per area variable magnifying and combining process are executed.

In order to accomplish the conversion value calculating and combining process, the character recognition section 71i has a function as a magnification recognition means, the marking discrimination circuit 80 has a function as an interval mark recognition means, and the image processing CPU 74 has functions as a dimension calculating means, a conversion means and a combining means. Further, in order to accomplish the per area variable magnifying and combining process, the image processing CPU 74 has functions as a ratio calculating means, a first and second magnification setting means, a first and second conversion means, and a combining means.

The following description will discuss a sequence of the conversion value calculating and combining process in the digital copying machine of the present embodiment in accordance with the flow chart of FIG. 4.

Figure 5A:
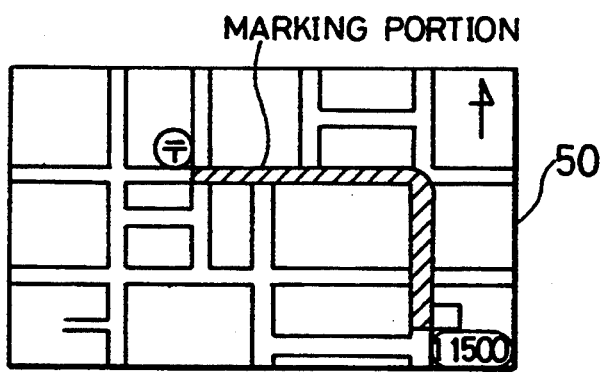
FIG. 5(a) is a schematic drawing which shows a state of a document image to be processed in the above-mentioned marking mode.
Figure 5B:
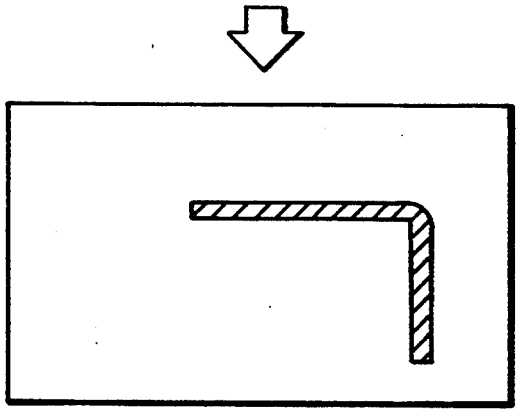
FIG. 5(b) is a schematic drawing which shows a state where a marking portion is extracted from the image.

At the time of selecting the marking mode, as shown in FIG. 5(a), a section which is desired to be measured on a document 50 such as a map should be preliminarily marked, and a reduction value shown in the document 50 should be preliminarily circled.

When the document 50 is set on the document platen 27 and the marking mode is selected (S1) by using the operation panel section 39, the marked document 50 is scanned (S2). Then, while the image data read from the CCD sensor 6 are stored in the main memory 73, the reduction value undergoes the character recognition in the character recognition section 71i, and the marking portion is recognized in the marking discrimination circuit 80 (S3). Here, in the character recognition section 71i, not only "1:1500" but also 1/1500, one one-thousand-five-hundredth, etc. can undergo the character recognition.

After completion of the document scan, a discrimination is made as to whether or not the marking portion has been recognized (S4). When the marking portion is recognized, a discrimination is made as to whether or not the reduction value is recognized (S5). When the reduction value is also recognized, the recognized marking portion is combined with the image data in the main memory 73, and the area of the marking portion is extracted (S6). Then, a .dimension of the marking portion is found from the number of picture elements in the horizontal scanning and the vertical scanning of the extracted area (S7) (see FIG. 5(b)).

Here, when it is discriminated that the marking portion has not undergone the character recognition at S4, and that the reduction value has not undergone the character recognition at S5, a warning is given that the conversion value calculating and combining process cannot be executed (S11), and the process is suspended.

The dimension obtained at S7 is multiplied by the reduction value which underwent the character recognition so as to calculate the distance of the marking portion (S8). For example, when the dimension of the marking portion obtained at S7 is 200 mm, a calculation is made as to "200×1500=300,000 mm", and 300,000 mm is divided by 1,000 so as to get 300 m.

The obtained distance value "300 m" is combined with the image data in the main memory 73 (S9) so as to be inserted in the proximity of the marking portion, and copying is executed (S10). In S9, when there exists a blank portion in the proximity of the marking portion, combining is executed so as to print out "300 m" on the blank portion, and when there does not exist a blank portion, combining is executed so as to print out "300 m" deeply and boldly.

Figure 5C:
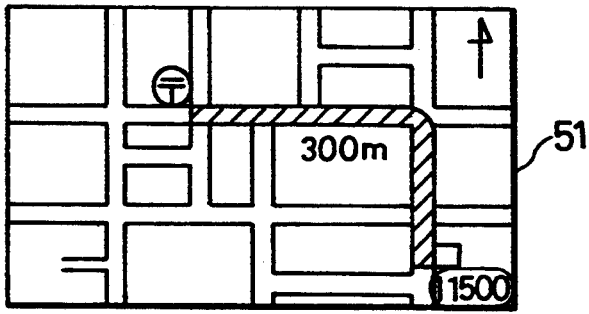
FIG. 5(c) is a schematic drawing which shows a state of an image copied in the marking mode.

In this way, a copy 51 in FIG. 5(c) is obtained, and the marking mode is completed.

Due to provision of the marking mode in the copying machine, when an exact distance of a specified section on a map, etc. is desired to be measured, an accurate distance value can be easily obtained only by marking a interval portion and a reduction value on a document and by specifying the marking mode so as to execute copying process. This eliminates troubles of reading a dimension on a map by using a ruler, multiplying the read value by the reduction value, etc.

The reduction value can undergo character recognition without marking the reduction value by circling.

Figure 6:
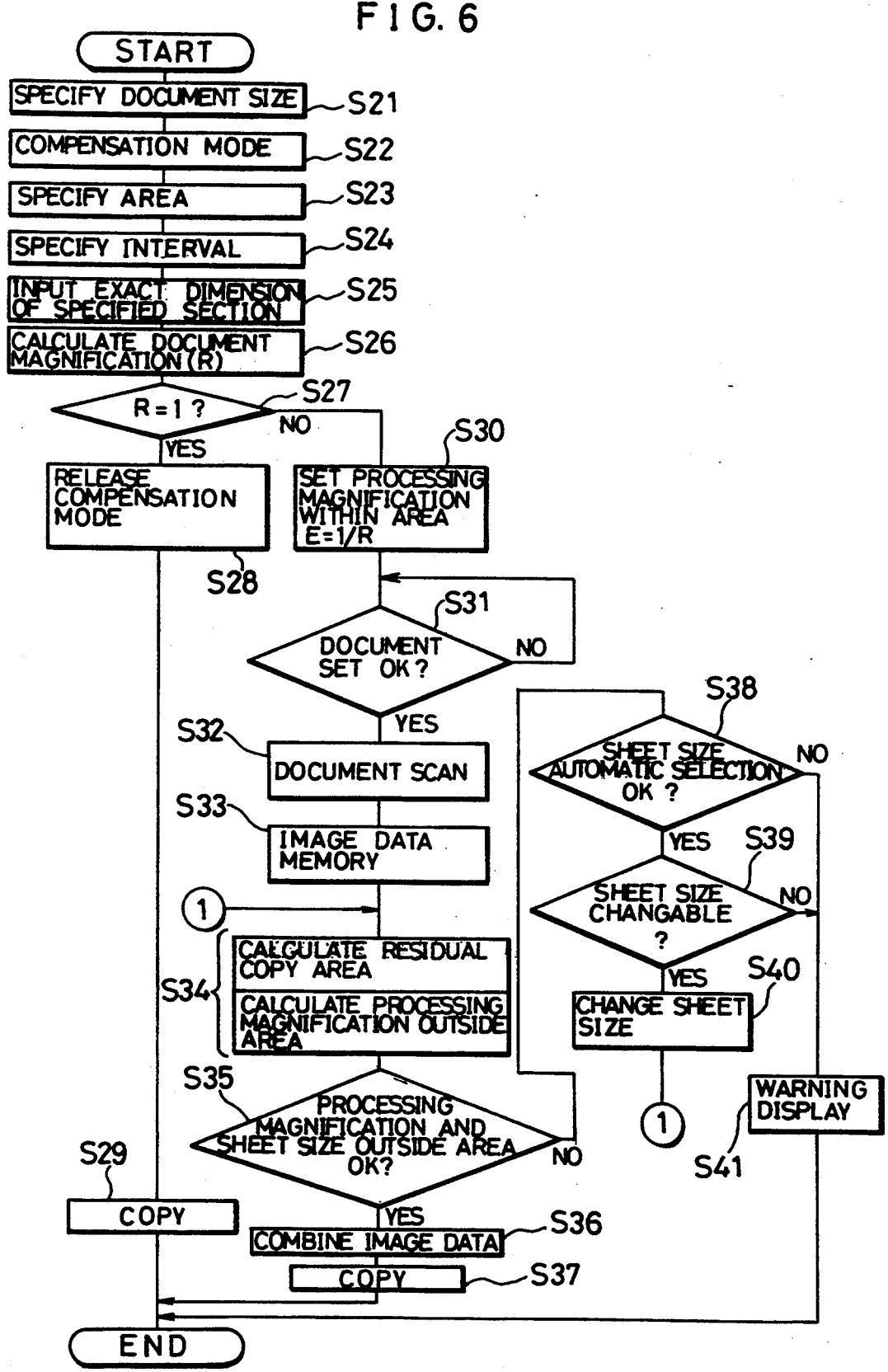
FIG. 6 is a flow chart which shows the operation of a compensation mode in the above-mentioned digital copying machine.

Next, the following description will discuss a sequence of a process in the digital copying machine of the present embodiment when the per area variable magnifying and combining process is executed referring to the flow chart in FIG. 6.

Prior to specifying process modes, a size of sheets is specified by pressing down a compensation mode setting key 38 on the operation panel section 39 (S21). When a size of a document is not specified, the size of the document is set as the size of sheets. At this time, a specification is done as to whether or not size of sheets is arbitrarily selected.

After the size of sheets is specified, a compensation mode for executing the per area variable magnifying and combining process is specified from the operation panel section 39 (S22). Next, while a document 52 of FIG. 7(a) is set upward on the tablet board 100a of the coordinate input section 100 provided on the upper surface of the copying machine main body 26, a specified area and a specifying section are specified by the coordinate input section 100 (S23 and S24). To specify the specified area and the specifying section, an operator presses down two points A and B which represent corners on a diagonal line of an area (rectangle) that is desired to be returned to an exact dimension on the document 52 set on the tablet board 100a by using the point pen 100b. Then, the operator presses down two points C and D, which represents the known distance, inside the rectangle indicated by alternate long and short dashes lines, whose specified points A and B are on the diagonal line.

Next, when the exact dimension between C and D which is the inputted specifying section is inputted by using the ten keys 37 on the panel operation section 39 (S25), a predetermined calculation is made so as to obtain a document magnification (R) (S26). Namely, the distance between C and D is calculated from the coordinates of the two points C and D which have been inputted at S24, and the calculated distance is compared with the exact dimension inputted at S25. Then, a magnification of the distance between C and D to the exact dimension is calculated thereby obtaining the magnification of the document 52.

When the document magnification R is obtained, a discrimination is made as to whether or not R is equal to 1 (S27). When R is equal to 1, it is discriminated that the magnification is 100%, that is, the document 52 has an exact dimension, and the compensation mode is released (S28) so as to execute copying process (S29).

In contrast, when R is not 1, it is discriminated that the image of the document 52 is variably magnified, the reciprocal of R is set as an inner area variable magnification specified by the points A and B, that is, an inner area processing magnification E (S30).

When the inner area processing magnification E is set, it is discriminated whether or not the document 52 is set on the document platen 27 (S31). When the document 52 is set on the document platen 27, the document 52 is scanned (S32), and the image data read from the CCD sensor 6 are stored in the main memory 73 (S33).

After completion of scanning, the size of sheets specified at S21 is compared with the size of the image data obtained by variably magnifying the specified area using the inner area processing magnification E obtained at S30. Then, the residual copy area is calculated, and an outer area processing magnification is calculated from the obtained residual copying area and image data outside the specified area (S34).

However, when the size of sheets is not specified at S21, the size of the document is calculated as the size of sheets.

In this manner, when the outer area processing magnification is obtained, a discrimination is made as to whether or not the outer area processing magnification area falls in the range of the variable magnification in the copying machine. Then, a discrimination is made as to whether or not the specified size of sheets is suitable (S35).

When the outer area processing magnification is out of the range of the variable magnification, and it is discriminated that the size of sheets is not suitable at S35, a discrimination is made as to whether or not the size of sheets can be automatically selected (S38). When the size of sheets cannot be automatically selected because the size of sheets automatic selection was not specified at the time of specifying the size of sheets by S21, a warning is given that the per area variable magnifying and combining process cannot be executed (S41), and the process is suspended.

In contrast, when the automatic selection can be executed (at S38) because the size of sheets automatic selection is specified at the time of specifying the size of sheets by S21, a larger or smaller size of sheets than the specified size of sheets is selected according to the outer area processing magnification, and a discrimination is made as to whether or not a sheet having the selected size is set (S39). When the sheet of selected size is not set, and the size of sheets cannot be changed, as mentioned above, a warning is given that the per area variable magnifying and combining process cannot be executed (S41), and the process is suspended.

On the other hand, when the sheet of selected size is set at S39, and it is discriminated that the size of sheets is changeable, the size of sheets is changed (S40). Thereafter, the sequence returns to S34 and the processes S34, S38, S39 and S40 are repeated until it is discriminated that the outer area processing magnification is suitable and the size of sheets is suitable.

When it is discriminated that the size of sheets is suitable at S35, the image data, which have variably magnified image data within the area by the inner area processing magnification E, is combined with the image data, which have magnified image data outside the area by the outer area processing magnification (S36), so as to execute copying process (S37).

Here, only the specified area is returned to the exact dimension, and the area other than the specified area is suitably reduced according to the size of sheets so as to obtain an copy 53 which is shown in FIG. 7(b). Then, the compensation mode is completed.

In the above processes, since the document magnification R is smaller than 1, and the document 52 which was reduced from the exact dimension is copied in the compensation mode, the area other than the specified area is reduced. On the other hand, when the document magnification R is greater than 1 and the document 52, which was enlarged from the exact dimension, is copied in the compensation mode, the area other than the specified area is enlarged.

In the above processes, since the exact dimension of the specified section is inputted at S25, the specified area is copied in the exact dimension. However, for example, it is also possible to obtain a copy, which is variably magnified by an integral multiple of the exact dimension, by inputting the integral multiple of the exact dimension at S25.

In contrast, when it is discriminated that R is equal to 1 at S27, the compensation mode is released at S28, but the processes after S28 can be executed without releasing the compensation mode at S28.

In addition, the specifying section and specified area are specified in the coordinate input section 100, but it is also possible to input the coordinates by using the ten keys 37, value up-and-down keys, etc. provided on the operation panel section 39.

This eliminates irresolution of discrimination as to whether an image of a drawing on a document has the exact dimension or is reduced and enlarged, and uncertainty of a magnification of a drawing due to repetitions of reducing and enlarging, thereby obtaining an image of a good quality whose magnification is set definitely.

An image processing apparatus having the above mentioned functions is not limited to the digital copying machine of the present embodiment, and it is also applicable to a digital printer, a facsimile, a scanner printer, etc.

EMBODIMENT 2

Referring to FIGS. 1, 2, and 8 through 17, the following description will discuss the second embodiment of the present invention. Here, those members of the present embodiment that have the same arrangement and function, and that are mentioned in the aforementioned first embodiment are indicated by the same reference numerals.

Figure 8:
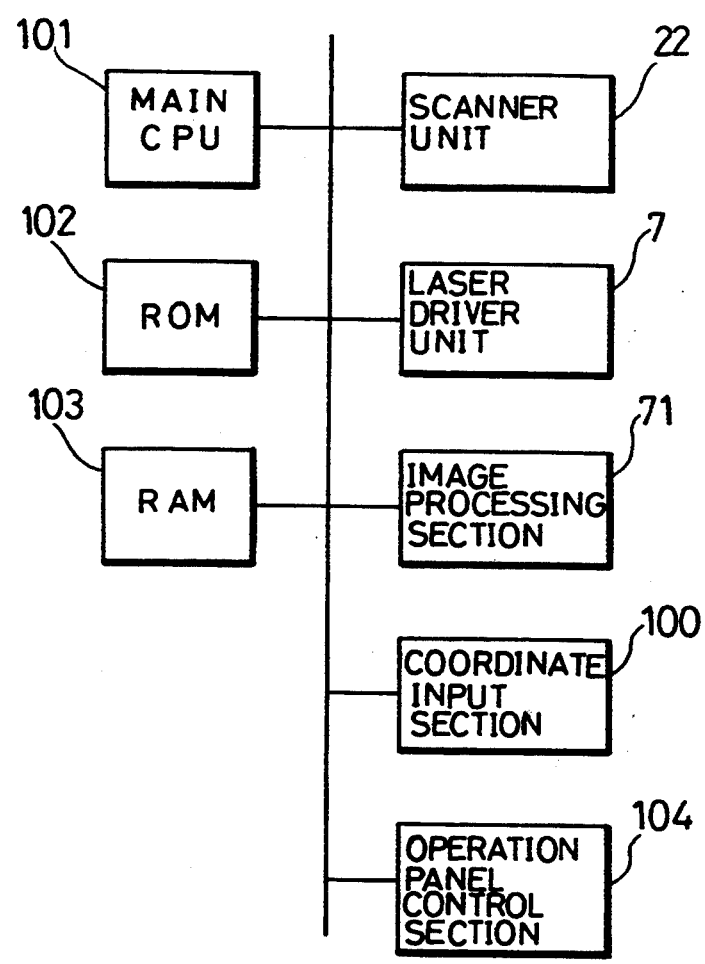
FIG. 8 is a block diagram which shows a main portion of the digital copying machine according to the second embodiment of the present invention.

As shown in FIG. 8, in a copying machine of the present embodiment, a plurality of control sections such as the scanner unit 22, a laser driver unit 7 are controlled by a main CPU 101. An ROM 102 is used as an area for storing a control program, and an RAM 103 is used for storing a parameter per copying machine and as a working area during execution of a program.

The scanner unit 22 reads the image data of a document set on the document platen 27 which is shown in FIG. 1, and the image data are processed by the image processing section 71. The image processing section 71 is an area for processing the read image data, more specifically, an area for changing an image density and an image magnification at an user's demand, for processing the image data when adding print data in a magnification-print mode. The data processed in the image processing section 71 are outputted by the laser driver unit 7 as a laser beam.

As mentioned before, the coordinate input section 100 is a tablet-type input unit, and as shown in FIG. 2, coordinates, which have been pressed down on the tablet board 100a by using the point pen 100b, is inputted in the coordinate input section 100. Here, for example, when the points A and B on the tablet board 100a are pressed down by the point pen 100b, a length between points A and B is obtained by calculation. This makes it possible to input the length between predetermined points on the document. The operation panel control section 104 controls the operation panel section 39.

Figure 9:
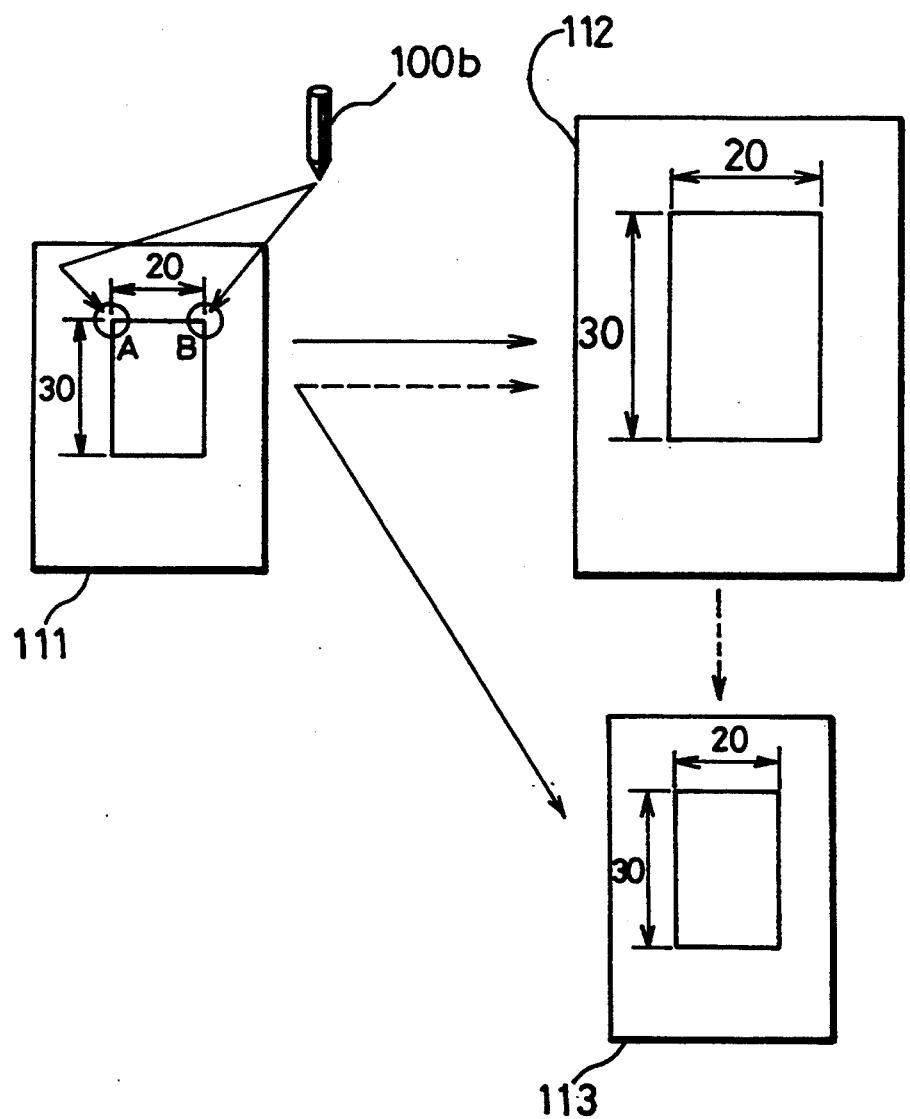
FIG. 9 is a drawing which explains a document and copies obtained by carrying out a variable magnification copying process on the document.
Figure 10:
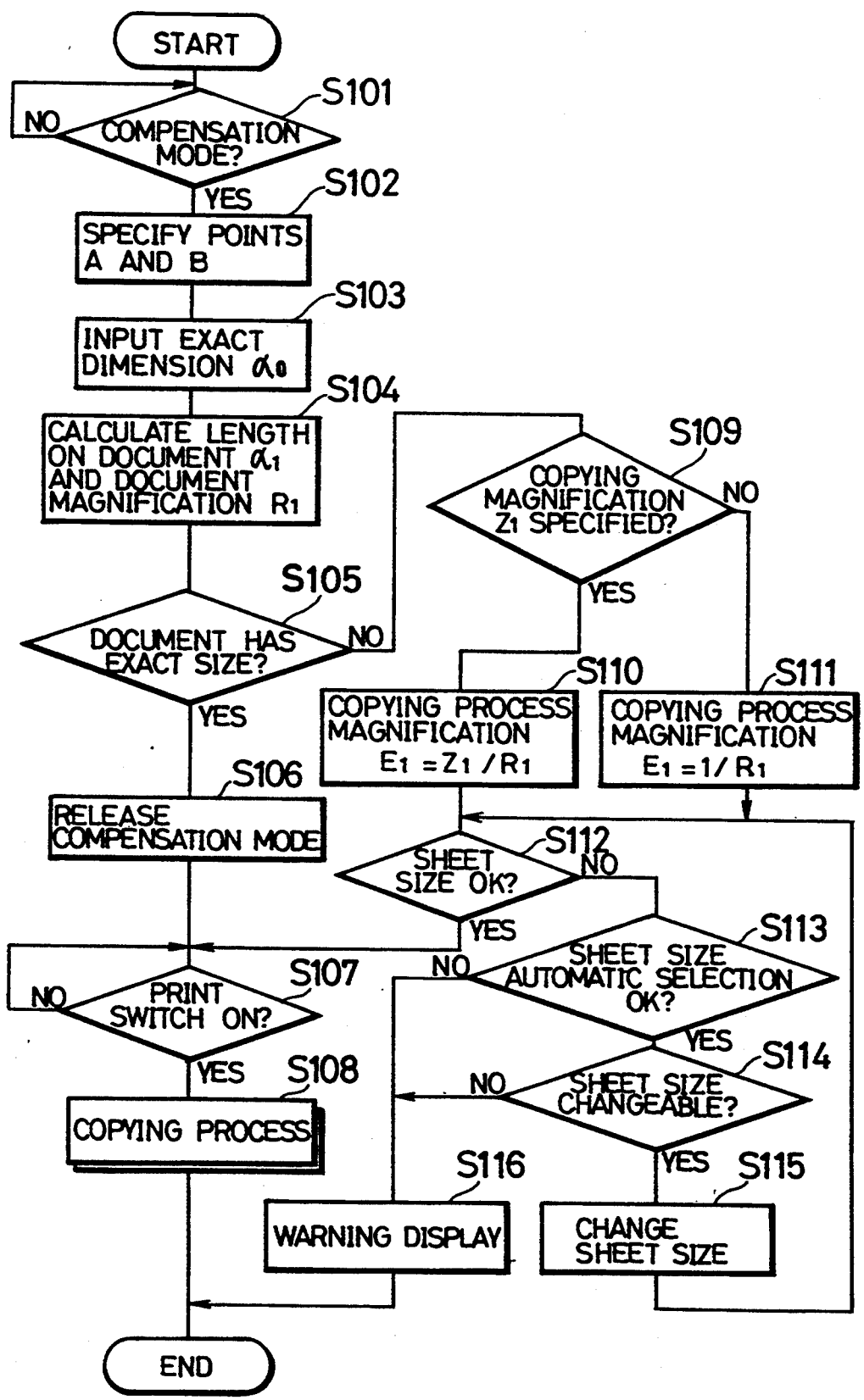
FIG. 10 is a flow chart which shows the sequence of processes for obtaining copies of FIG. 9.

FIGS. 9 and 10 are drawings which explain a variable magnification copying processes. FIG. 9 is a drawing which shows an example of setting copying magnification. FIG. 10 is a flow chart which shows a sequence of copying processes. Referring to FIGS. 9 and 10, the description will be given of the copy processes.

Here, based upon a document 111 which was reduced to 60% from its exact dimension, a copy 112 having an exact dimension and a copy 113 having a dimension reduced to 70% of the exact dimension are obtained.

First, when the compensation mode setting key 38 on the operation panel section 39 is pressed down, the compensation mode is set (S101). When the document 111 is placed on the tablet board 100a and the two arbitrary points A and B are pressed down by the point pen 100b, the coordinates of the two points A and B are read (S102).

An exact dimension $\alpha_0$ between points A and B is inputted by the ten keys 37 or the value up-and-down keys (S103). Next, a length $\alpha_1$ between the points A and B on the document 111 is obtained according to the coordinates inputted at S102, and the length $\alpha_1$ is compared with the exact dimension $\alpha_0$ inputted at S103 so as to calculate a magnification $R_1$ of the document 111 to the exact dimension $\alpha_0$ (S104).

If the calculated length $\alpha_1$ is 12 mm and the exact dimension $\alpha_0$ is 20 mm, the magnification $R_1$ of the document 111 to the exact dimension $\alpha_0$ will be obtained as follows:

$$R_1 = \alpha_1/\alpha_0 \times 100 = 12/20 \times 100 = 60(\%)$$

Thereafter, when the obtained magnification $R_1$ is 100% (the document 111 has an exact dimension) (S105), the compensation mode is released (S106). After usual image processes (density changing process, magnification changing process, etc.) has been carried out, when a print switch, not shown, is turned ON (S107), a copy process is carried out (S108).

When the magnification $R_1$ is 100%, the variable magnification process after S109 is performed, and copying is carried out in an arbitrary magnification $Z_1$ to the exact dimension.

A discrimination is made as to whether or not the copying magnification $Z_1$ is specified (inputted) from the operation panel section 39 (S109). When the copying magnification $Z_1$ is inputted, the image data are processed so that the magnification of the copy 113 to the exact dimension will be the specified copying magnification $Z_1$, and a magnification $E_1$ of the copy 113 to the document 111 is set in an optical system in the copying machine as a copy process magnification (S110).

In this case, the magnification $E_1$ to the image data of the document 111 will be obtained using the following equation:

$$E_1 = (Z_1/100)/(R_1/100) \times 100$$

For example, if the specified copying magnification (magnification to the exact dimension) $Z_1$ is 70%, the magnification $E_1$ to the document data will be obtained as follows:

$$E_1 = (70/100)/(60/100) \times 100 \approx 117(\%)$$

Therefore, in the copying machine of the present embodiment, the copy process magnification is set as 117% to carry out a copy process, thereby obtaining the copy 113 of 70% to the exact dimension.

When the copying magnification is not specified at S109, the image data is processed so as to carry out a copy process in the exact dimension (S111). Namely, when the document 111 is reduced or enlarged, the data is processed so as to have the exact dimension.

In this case, the magnification $E_1$ to the document data will be obtained as follows:

$$E_1 = 1/(60/100) \times 100 \approx 167(\%)$$

therefore, the copy process magnification becomes 167%.

In the above manner, when the copy process magnification is found, a discrimination is made as to whether or not a size of a specified copy sheet is suitable (S112). When the size of sheets is suitable, the sequence goes to S107. However, the size of sheets is not suitable, a discrimination is made as to whether or not the size of sheets can be automatically selected (S113).

When the size of sheets can be automatically selected at S113, a discrimination is made as to whether or not the size of sheets is changeable (S114). When the size of sheets is changeable, the size of sheets is changed (S115), and the sequence returns to S112. When it is impossible to carry out a copy process because a sheet of too big size is required at S113 or S114, a warning is given (S116).

The above-mentioned processes provide a copy 112 having the exact dimension or a copy 113 in the arbitrary magnification $Z_1$ (70% in the present embodiment) to the exact dimension.

In the above processes, the image data having the exact dimension or the arbitrary magnification $Z_1$ to the exact dimension are formed only by setting the compensation mode and by inputting the length $\alpha_1$ between the predetermined points on the document 111, the exact dimension $\alpha_0$ between the predetermined points and the arbitrary magnification $Z_1$, thereby carrying out printing (copying), displaying on a screen and transmitting (transmitting by a facsimile). As a result, it is possible to easily process the image data having the arbitrary magnification $Z_1$ to the exact dimension. With the copied image at the arbitrary magnification $Z_1$ to the exact dimension, since an image of the exact dimension is easy to be grasped, it is convenient for processing data of a drawing of a building, etc.

In the above processes, as to a reduced document at a magnification of 60%, a copy having the exact dimension and a copy reduced to 70% to the exact dimension are produced, however, it is possible to suitably set the reduction magnification and the enlargement magnification.

Figure 11:
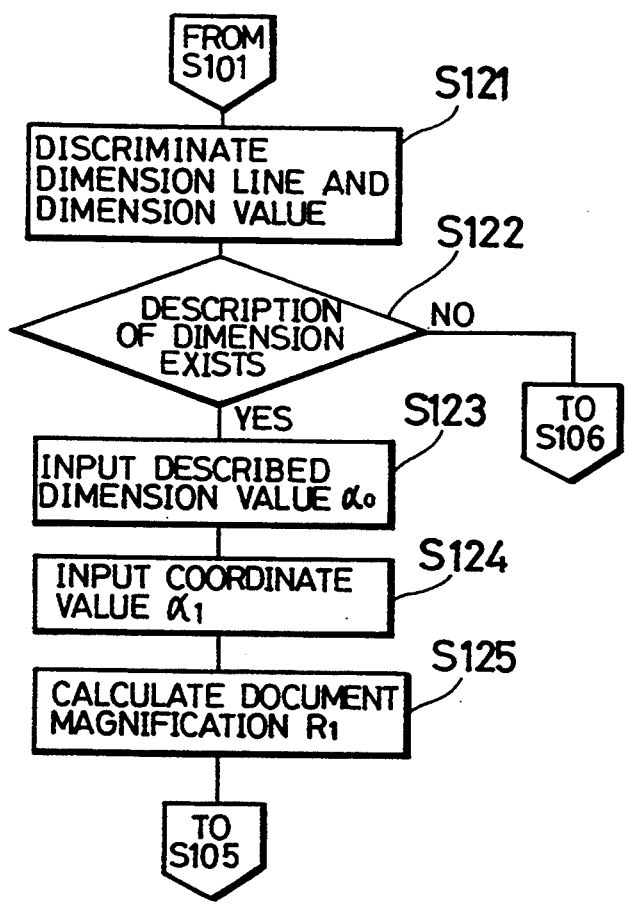
FIG. 11 is a flow chart which shows the sequence of processes for reading data of a dimension line on a document during processes of FIG. 10.

According to a sequence of processes shown in a flow chart of FIG. 11, the exact dimension $\alpha_0$ between the predetermined points may be inputted by reading the data of dimension line shown on the document 111. The following description will discuss this process.

First, after the process S101 shown in FIG. 10 is carried out, features of a dimension line which is in use for a drawing (description condition of a dimension, a segment, a dimension value) are preliminarily stored in the RAM 103. The image data of the document 111 are compared with sample data for each block, and a discrimination is made as to whether or not a dimensional line exists (S121). At this time, a discrimination is made as to whether or not a dimension is shown (S122).

When there is a description about a dimension, a value shown in the proximity of the dimension line is inputted as the exact dimension $\alpha_0$ between the points shown by the dimension line (S123). Further, coordinates of the points on the both sides of the dimension line (for example, coordinates of points of arrows) are read, and the length between the coordinates is inputted as the length $\alpha_1$ on the document 111 (S124). Based upon the exact dimension $\alpha_0$ and the length $\alpha_1$ on the document 111 which have been inputted in the above-mentioned manner, the magnification $R_1$ of the document 111 is obtained (S125), and the sequence goes to S105 in FIG. 10.

However, when no dimension line exists on the document 111 at S121, the sequence goes to S106 in FIG. 10, and in this case, a warning may be given.

In the above processes, when a dimension display mode is set, and the length $\alpha_1$ between the specified points on the document 111, the exact dimension $\alpha_0$ between the specified points and an arbitrary magnification $Z_2$ are inputted, the image data of the document 111 which have been processed so as to have the arbitrary magnification $Z_2$ is added by a magnification $R_2$ to the exact dimension. Thereafter, the image data is printed out, displayed on a screen, transmitted, etc. This makes it easy to recognize what magnification to the exact dimension the image data have. Namely, since the magnification to the exact dimension of the data which have undergone image process is automatically calculated and the calculated magnification is added into the image data, the image data, which have been printed or displayed on the screen, make it easy to recognize the magnification of the image and to grasp the exact dimension.

Here, to input the dimension on the document 111, the ten keys 37, the value up-and-down keys, etc. may be also used.

Figure 12:
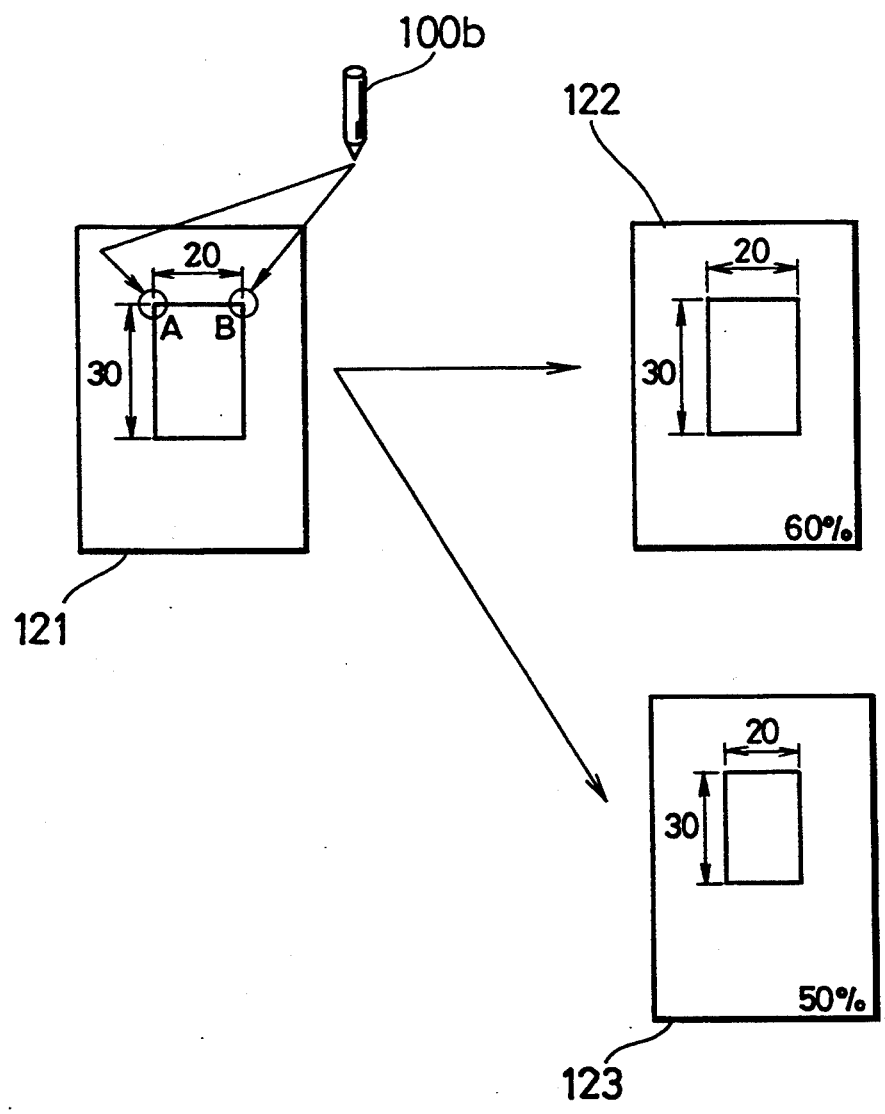
FIG. 12 is an explanatory drawing which shows a document and copies obtained by carrying out a variable magnification copying process and a variable printing process on the document.
Figure 13:
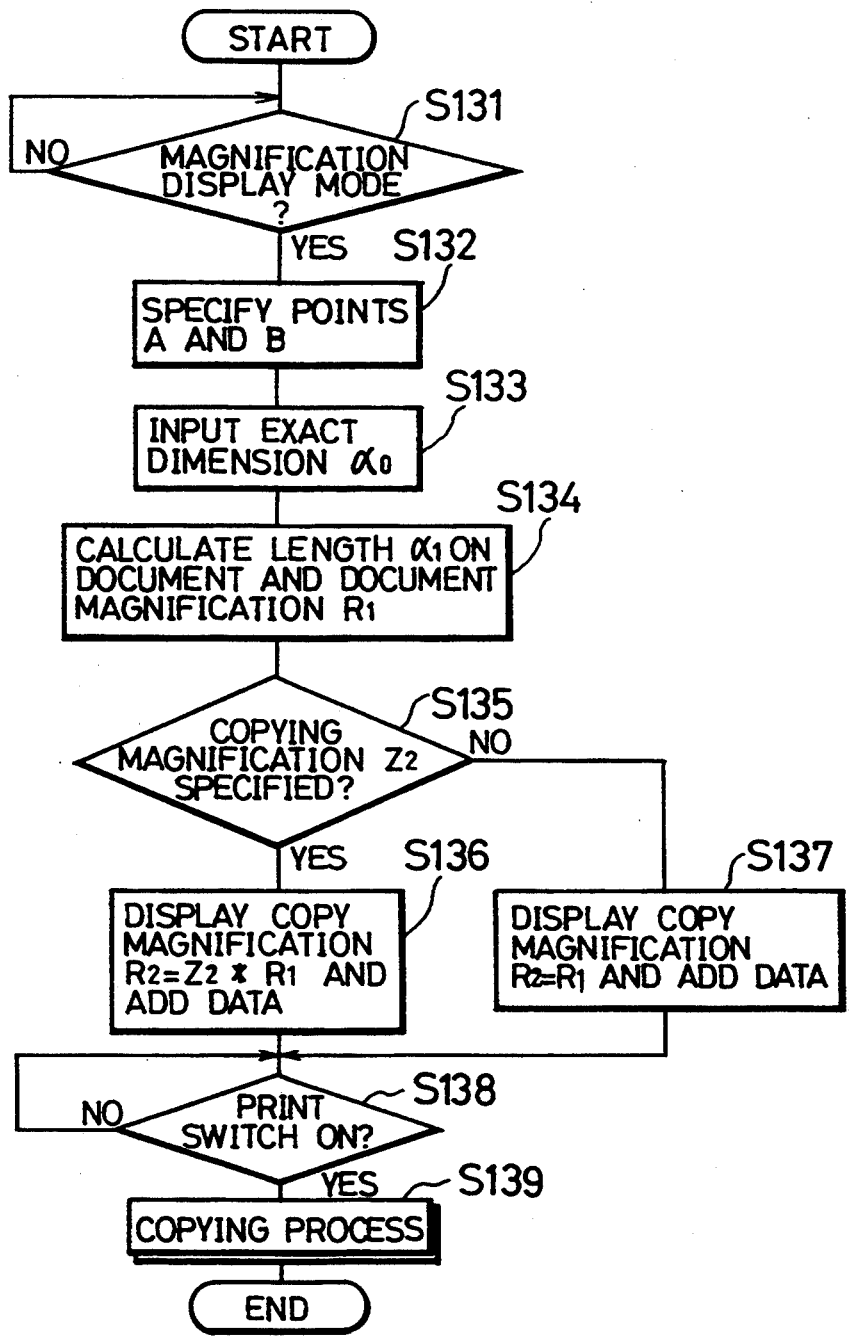
FIG. 13 is a flow chart which shows the sequence of processes for obtaining copies of FIG. 12.

FIGS. 12 and 13 are drawings which explain a magnification display in variable magnification copying process. FIG. 12 is a drawing which shows an example of magnification printing. FIG. 13 is a flow chart which shows a sequence of copying processes. Referring to FIGS. 12 and 13, the following description will discuss the copying processes.

Here, a copy 122 having a equal magnification to the document 121, and a copy 123 having a magnification of 83% to the document 121 are produced based upon the document 121 which have been reduced to 60% to the exact dimension, and the magnifications of the respective copies 122 and 123 to the exact dimension are printed in the bottom right-handed corner of the image. However, the printing place for the magnification is not limited to the above-mentioned position.

When the magnification display mode setting key 41 on the operation panel section 39 is pressed down, the magnification display mode is set (S131). When the document 121 is placed on the tablet board 100a, and arbitrary two points A and B are pressed down by the point pen 100b, the respective coordinates of the two points A and B are read (S132).

Meanwhile, the exact dimension $\alpha_0$ between the points A and B is inputted by the ten keys 37 on the operation panel section 39 (S133). Next, the length $\alpha_1$ between the points A and B on the document 121 is obtained based upon the coordinates inputted at S132, the length $\alpha_1$ is compared with the exact dimension $\alpha_0$ inputted at S133, and the magnification $R_1$ of the document 121 to the exact dimension $\alpha_0$ is calculated (S134).

If the calculated length $\alpha_1$ is 12 mm, and the exact dimension $\alpha_0$ is 20 mm, the magnification becomes 60%.

Thereafter, a discrimination is made as to whether or not the copying magnification $Z_2$ to the document 121 is specified (inputted) (S135). When neither enlargement nor reduction is carried out on the document 121, namely, the copying magnification $Z_2$ is not inputted, the magnification of the document 121 is used as the copy magnification $R_2$. Therefore, the magnification of the document 121 obtained at S134 is displayed on the liquid crystal display panel 42, and the magnification $R_2$ ($=R_1$) of the document 121 to the exact dimension is added to the image data so as to be stored (S137).

When the print switch is turned on (S138), the copying process is carried out in the even magnification (S139). At this time, the copy magnification $R_2$ (60%) to the exact dimension is printed in the corner of the copy 122.

In contrast, when the copying magnification is specified at S135 by the operation panel section 39, the copying process is set to the copying magnification $Z_2$ so as to be executed at $Z_2$ to the document 121. For example, if the copying magnification $Z_2$ inputted by the operation panel section 39 is 83%, the copying process is executed in the magnification of 83% to the document. The magnification $R_2$ of the copy 123 to the exact dimension will be obtained as follows:

$$R_2 = (Z_2/100) \times (R_1/100) \times 100$$
$$= (83/100) \times (60/100) \times 100 \approx 50\ (\%)$$

The copy magnification $R_1$ obtained by the above equation is displayed on the liquid crystal display panel 42, and added to the image data so as to be stored (S136). Then, when the print switch is turned on (S138), the copying process is executed in the inputted magnification (83%) (S139). At this time, the copy magnification (50%) to the exact dimension is printed in the corner of the copy 123.

In this process, the magnification is suitably set in like manner of the aforementioned process in the case whichever enlargement or reduction is executed. To input the exact dimension $\alpha_0$, not only the ten keys 37 but also the value up-and-down keys, a method for reading the dimension on the document 121, etc. may be used. Further, to input the length $\alpha_1$ on the document 121, not only the tablet board 100a and the point pen 100b but also a method for reading the coordinates between the points which have been measured, the ten keys 37 and the value up-and-down keys may be used.

In the above processes, the exact dimension $\alpha_0$ between the predetermined points of the image data and the length $\alpha_1$ on the document 121 are automatically inputted, thereby saving a trouble of inputting.

Figure 14:
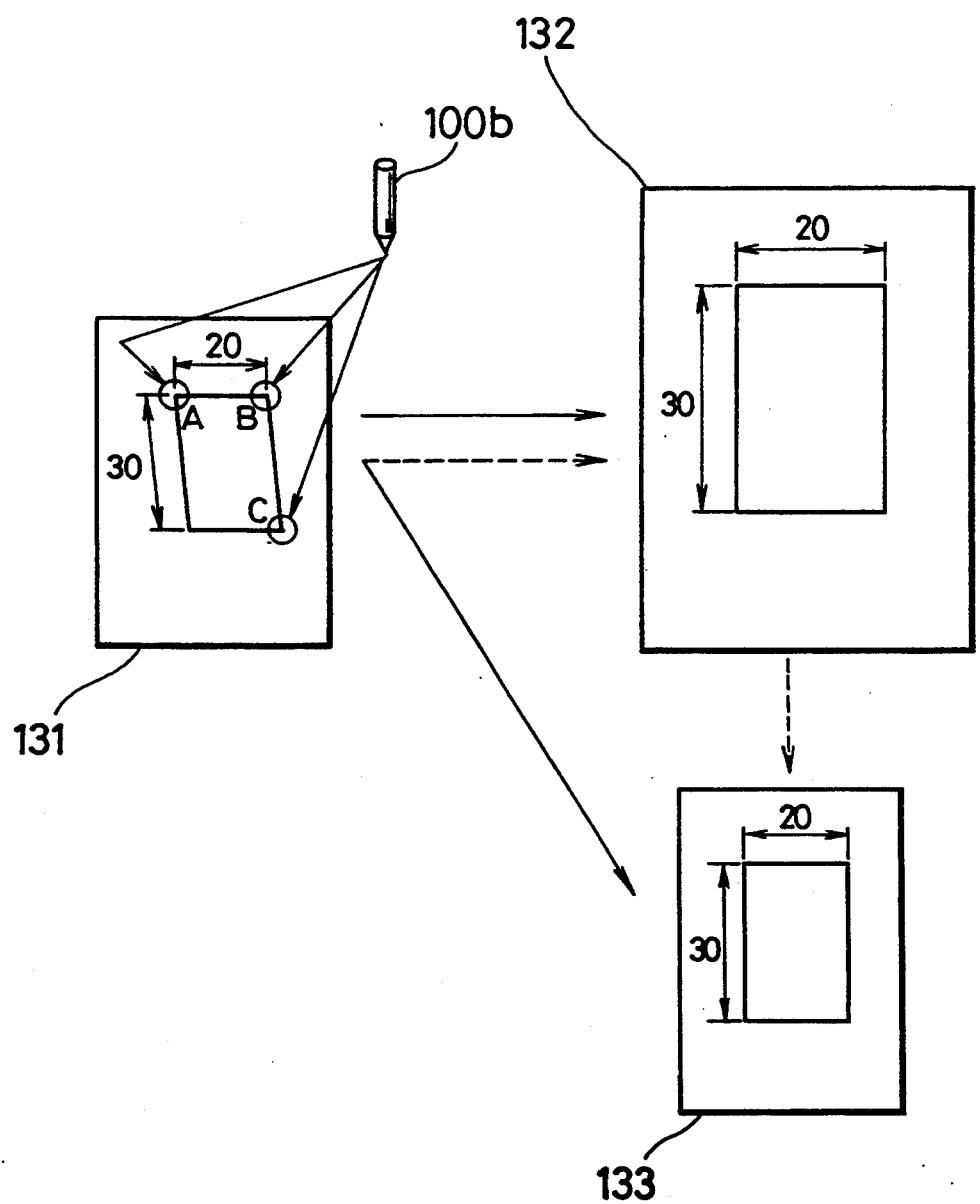
FIG. 14 is an explanatory drawing which shows a document and copies obtained by carrying out a variable magnification copying process with a distortion compensation on the document.
Figure 15:
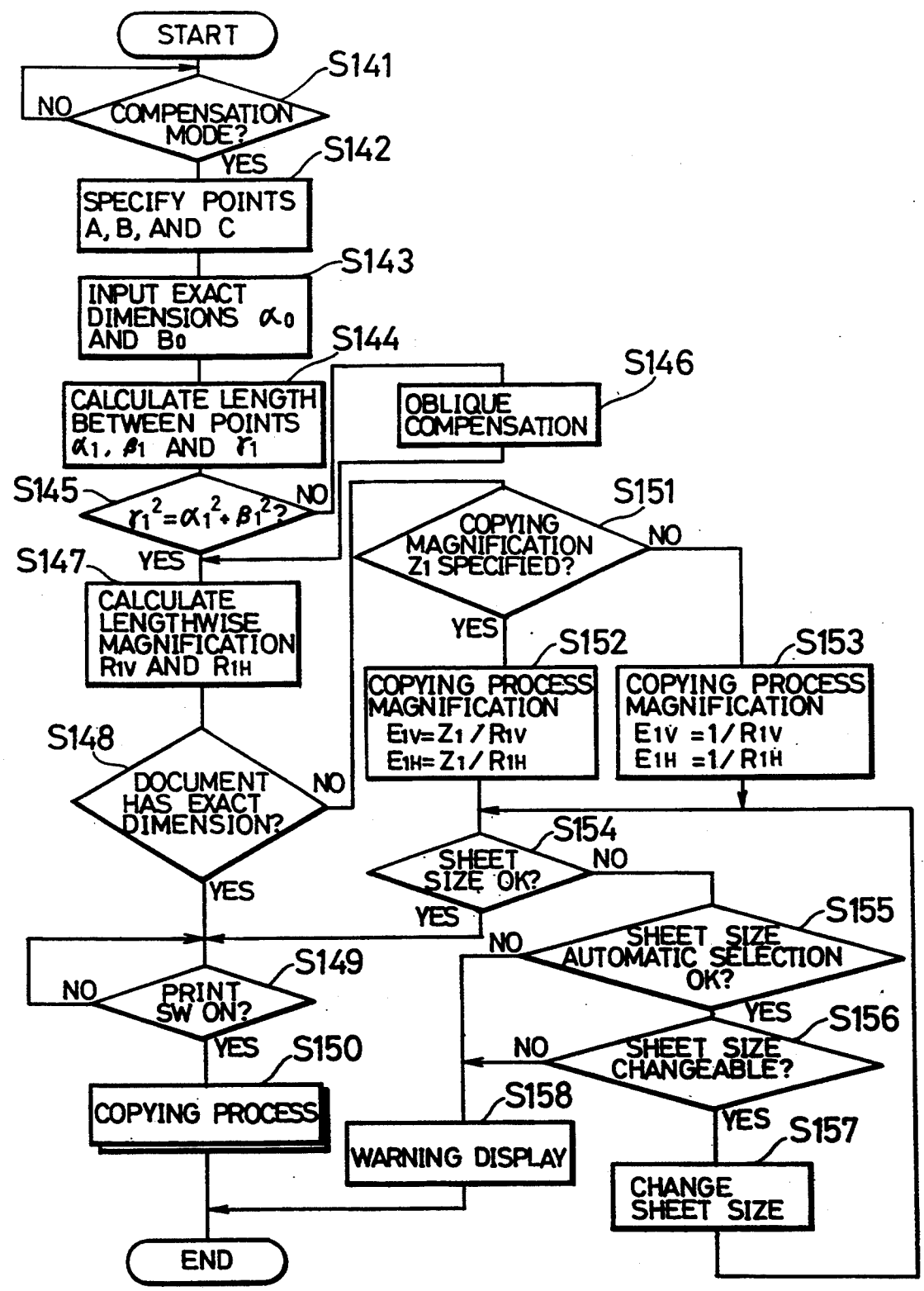
FIG. 15 is a flow chart which shows the sequence of processes for obtaining copies of FIG. 14.

FIGS. 14 and 15 are drawings which explain a variable magnification copying process for compensating a distortion. FIG. 14 is a drawing which shows an example of setting a copying magnification. FIG. 15 is a flow chart which shows a sequence of copying processes. Referring to FIG. 14 and 15, the following description will discuss the copying processes.

Here, as to a document 131 where a distortion is caused in a lengthwise/breadthwise direction due to repetitions of copying, etc., the distortion is compensated, copies 132 and 133 are compensated to the arbitrary magnifications (here, two sorts of magnifications, 100% and 70%) to the exact dimension.

First, when the compensation mode setting key 38 on the operation panel section 39 is pressed down, the compensation mode is set (S141). When the document 131 is placed on the tablet board 100a, and three points A, B and C are pressed down by the point pen 100b, the respective coordinates of the three points A, B and C are read (S142). At this time, with respect to the inputted points A, B and C, a segment A-B becomes a breadthwise segment and a segment B-C becomes a lengthwise segment, and each point is set so that the segment A-B and the segment B-C cross at right angles to each other. Meantime, the exact dimensions $\alpha_0$ between the points A and B and $\beta_0$ between the points B and C are inputted by using the ten keys 37, the value up-and-down keys, etc. on the operation panel section 39 (S143).

Next, to grasp the state of the lengthwise/breadthwise distortion of a document 131, a length $\alpha_1$ between the points A and B, a length $\beta_1$ between the points B and C, and a length $\gamma_1$ between the points C and A on the document 131 are obtained (S144) based upon the coordinates inputted at S142. The value $\gamma_1^2$ is compared with the value obtained from $\alpha_1^2 + \beta_1^2$ (S145) based upon the lengths $\alpha_1$, $\beta_1$ and $\gamma_1$. If the segment A-B and the segment B-C cross at right angles to each other, the equation $\gamma_1^2 = \alpha_1^2 + \beta_1^2$ holds. However, if a distortion occurs, the equation $\gamma_1^2 \neq \alpha_1^2 + \beta_1^2$ holds.

When the document 131 is a copy, this distortion is caused due to lifting of the document, etc. at the time of previous copying in the above copying processes, the compensation can be made by respectively setting the lengthwise copy magnification and the breadthwise copy magnification. Therefore, $\gamma_1^2 \neq \alpha_1^2 + \beta_1^2$ is changed to $\gamma_1^2 = \alpha_1^2 + \beta_1^2$ and the coordinate of the point C is transferred so that the length $\beta_1$ is not changed, thereby compensating a oblique distortion (S146).

Next, the breadthwise magnification $R_{1H}$ ($\alpha_1/\alpha_0 \times 100$) of the document 131 to the exact dimension and the lengthwise magnification $R_{1V}$ ($\beta_1/\beta_0 \times 100$) of the document 131 to the exact dimension are calculated (S147). When $R_{1H}$ and $R_{1V}$ are 100%, the magnification is not compensated (S148) because the document 131 has the exact dimension. Then the print switch is checked if it is turned on (S149), and the copying process is executed (S150).

In the above processes, when the magnification $R_{1H}$ and $R_{1V}$ are 100%, the magnification is not compensated, but the magnification may be compensated even when the document 131 has the exact dimension by eliminating the process S148.

When the document 131 has not the exact dimension at S148, if the copying magnification $Z_1$ to the exact dimension is specified by the operation panel section 39 (S151), a lengthwise copying process magnification $E_{1H}$ and a breadthwise copying process magnification $E_{1V}$ are obtained (S152) based upon $Z_1$, $R_{1H}$ and $R_{1V}$ so that the magnification to the exact dimension of a copy becomes the magnification $Z_1$. In this case, the magnification $Z_1$ of a whole copy is inputted as the specified magnification, but the copying process magnification may be obtained by respectively inputting the lengthwise copy magnification $Z_{1H}$ and the breadthwise copy magnification $Z_{1V}$.

When the copying magnification $Z_1$ is not specified at S151, the lengthwise copying process magnification $E_{1H}$ and the breadthwise copying process magnification $E_{1V}$ are obtained based upon $R_{1H}$ and $R_{1V}$ (S153). Thereafter, a size of sheets whereon an image is copied is set (S154), and the size of sheets is automatically selected or changed if necessary (S155, S156 and S157) so as to execute the copying process. (S150). At this time, when the copying process cannot be executed because a sheet requires too large size, a warning is given (S158).

The above-mentioned processes compensate the distortion of the image as shown in the copies 132 and 133, even when the document 131 has a distortion of the image, and the copying process is executed in an arbitrary magnification to the exact dimension (for example, the magnification of the copy 132 is 100% and the magnification of the copy 133 is 70%).

Here, in the above processes, when the compensation mode setting key 38 on the operation panel section 39 is pressed down, both of the distortion of the image and the magnification are compensated. However, the variable magnification copying process which is first mentioned in the present embodiment, only the magnification is compensated when the compensation mode setting key 38 is pressed down, and the both of the distortion of an image and the magnification are compensated by providing another compensation mode setting key and pressing down this key.

To input the lengths $\alpha_1$, $\beta_1$ and $\gamma_1$ between respective points A, B and C, which represent angle suggestion data on an image, the tablet board 100a and means for calculating $\alpha_1$, $\beta_1$ and $\gamma_1$ at S144 are used. However, $\alpha_1$, $\beta_1$ and $\gamma_1$ may be inputted directly by the ten keys 37 or other means.

Furthermore, in the above process, after a distortion of the image on the document 131 has been compensated, the copying process is carried out at the inputted magnification $Z_1$ to the exact dimension by the processes shown in FIGS. 9 and 10, but the processes combined by those shown in FIGS. 12 and 13 can be also used. More specifically, after the distortion of the image on the document 131 is compensated, the document 131 is copied at the inputted magnification, and the copy magnification to the exact dimension is added into the image data.

In the above processes, since the distortion of the image is compensated, even if a distortion of the image occurred due to repetitions of copying, etc., an accurate image can be printed or displayed on the screen by compensating the distortion.

Figure 16:
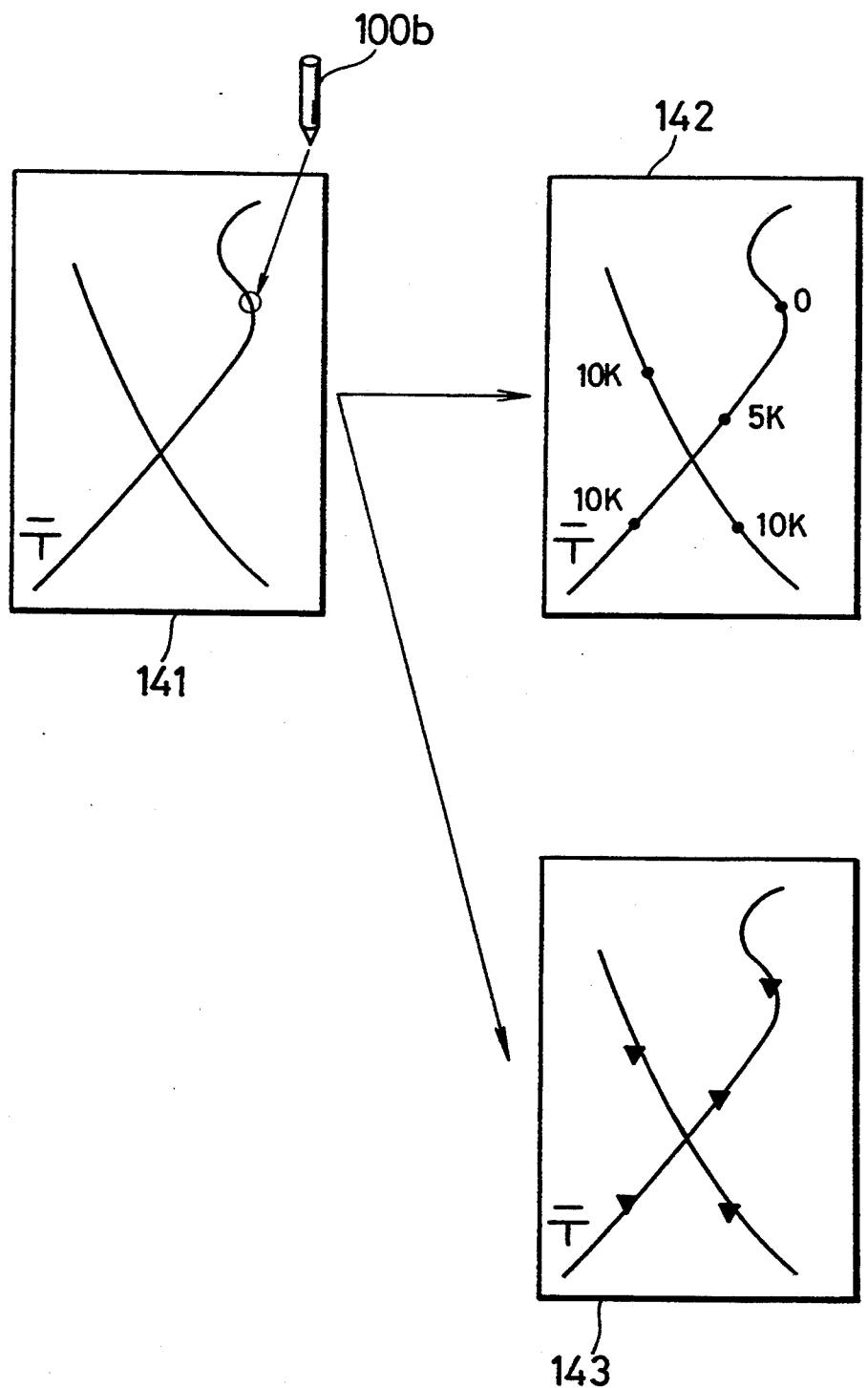
FIG. 16 is an explanatory drawing which shows a map and the printed map obtained by carrying out an added marking process on the map.
Figure 17:
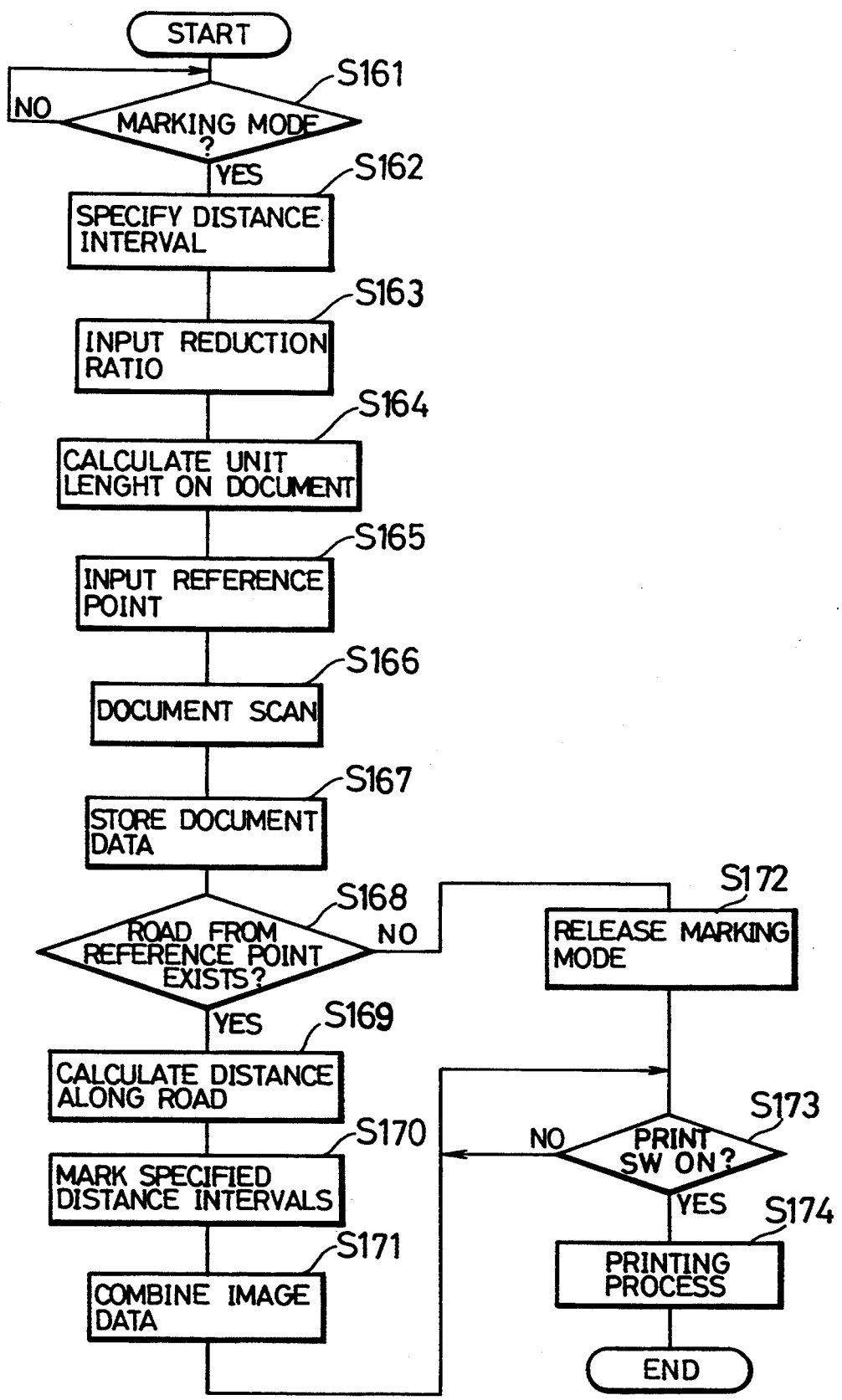
FIG. 17 is a flow chart which shows the sequence of processes for obtaining the printed map of FIG. 16.

FIGS. 16 and 17 are drawings which explain marking processes. FIG. 16 is a drawing which shows an example of a copy produced with markings added to the map. FIG. 17 is a flow chart which shows a sequence of copying processes. Referring to FIGS. 16 and 17, the following description will discuss copying processes.

Here, to obtain a copy 142, distance values at 5 k intervals or point marks are added onto the map 141.

First, when the marking mode setting key 40 is pressed down, the marking mode is set (S161). Then, when a distance interval for marking is specified (S162), and the reduction value of the map 141 is inputted (S163), an unit length on the map 141 is calculated based upon the interval and the reduction value (S164). The unit length varies with a reduction value on the map 141. For example, when the reduction value is low, the unit distance is set for 1 km, and the length for 1 km on the map 141 is obtained.

Next, when the map 141 is placed on the tablet board 100a, and a point which represents a reference point on the map 141 is pressed down by the point pen 100b, the coordinate is inputted (S165). Then, the map 141 is scanned (S166), and the scanned data on the map 141 are stored (S167). Further, The reference point inputted at S165 is superimposed on the read document data, and the road is detected in accordance with the reference point (S168).

The road is detected by comparing with sample data of the road for each block of the image data on the map 141 based upon features of the road (segment or a blank portion circled by the segment, an intersection, etc.) when the road data is not recognized, the marking mode is released (S172).

When the road data are recognized at S168, differences in coordinates are calculated for each block beginning with the reference points, and while the differences are added to one another, the distance is obtained from the unit length obtained at S164 (S169). Then, the markings are added for each distance interval obtained at S162 (S170), the combined image data whereto the markings have been stored (S171). Thereafter, when the print switch is turned on (S173), the image data stored at S171 are printed out (S174).

As shown in FIG. 16, the copy 142, whereon kilometers (5 k, 10 k . . . ) are added, and the copy 143, whereon markings (black upside down triangles) are added at predetermined intervals, can be obtained.

As mentioned above, with this process, the markings are added to the road on the map 141 at an arbitrary interval starting at the reference point, thereby printing and displaying the image data on a sheet of paper and on a screen. Therefore, it is possible to clarify a distance on a road of a reduced map, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:
   image input means for reading a document image;
   interval specifying means for specifying an arbitrary interval in a document image read by said image input means;
   dimension calculating means for calculating a dimension of the interval;
   dimension input means for inputting a prescribed dimension of the interval;
   ratio calculating means for calculating a ratio of the calculated dimension of the interval to the prescribed dimension;
   magnification input means for inputting an arbitrary magnification to an exact dimension as the prescribed dimension;
   conversion magnification calculating means for calculating a conversion magnification, which is used in the case where a size of the document image is converted, in accordance with the calculated ratio and the input magnification so that the document image has the same dimension as an image which has been obtained by converting a size of the image having an exact dimension of the document data at a magnification input by said magnification input means; and
   conversion means for converting a size of the document image in accordance with the conversion magnification.

2. The image processing apparatus as defined in claim 1, further comprising image output means for visualizing and outputting the image data of the document image whose size has been converted by said conversion means.

3. The image processing apparatus as defined in claim 1, wherein said interval specifying means includes interval specifying point input means for specifying a length between two coordinates as an arbitrary interval by inputting the two coordinates.

4. The image processing apparatus as defined in claim 3, further comprising:
   dimension line recognition means for recognizing a dimension line shown in the document image from image data of the document image;
   wherein said interval specifying point input means includes coordinate reading means for reading coordinates at both ends of the dimension line.

5. The image processing apparatus as defined in claim 4, wherein said dimension input means includes dimension value reading means for reading a dimension value mentioned on the dimension line as a prescribed dimension.

6. The image processing apparatus as defined in claim 1, further comprising size changing means for changing a size of sheets when the document image whose size has been converted by said conversion means is expected to exceed the predetermined size of sheets.

7. The image processing apparatus as defined in claim 6, further comprising warning means for warning that processes by said image output means cannot be carried out when a size of sheets cannot be changed by said size changing means.

* * * * *